United States Patent
Naschitz et al.

(10) Patent No.: US 12,206,780 B2
(45) Date of Patent: Jan. 21, 2025

(54) COMPUTER-BASED SYSTEMS CONFIGURED FOR INTERACTIVE SESSIONS TO AUTOMATICALLY MEDIATE EXECUTIONS RELATED TO CHEMICAL COMPOUNDS/MOLECULES AND/OR ASSOCIATED TECHNOLOGIES AND METHODS OF USE THEREOF

(71) Applicants: Anat Naschitz, Tel Aviv (IL); Jan Schultink, Tel Aviv (IL)

(72) Inventors: Anat Naschitz, Tel Aviv (IL); Jan Schultink, Tel Aviv (IL)

( * ) Notice: Subject to any disclaimer, the term of this patent is extended or adjusted under 35 U.S.C. 154(b) by 0 days.

(21) Appl. No.: 18/446,939

(22) Filed: Aug. 9, 2023

(65) Prior Publication Data
US 2023/0388125 A1  Nov. 30, 2023

Related U.S. Application Data

(63) Continuation of application No. PCT/IB2022/000073, filed on Feb. 9, 2022.
(Continued)

(51) Int. Cl.
H04L 29/06  (2006.01)
H04L 9/00  (2022.01)
H04L 9/32  (2006.01)

(52) U.S. Cl.
CPC .......... H04L 9/3213 (2013.01); H04L 9/3247 (2013.01); H04L 9/50 (2022.05)

(58) Field of Classification Search
CPC ........ H04L 9/3213; H04L 9/3247; H04L 9/50
See application file for complete search history.

(56) References Cited

U.S. PATENT DOCUMENTS 9,075,498 B1 *  7/2015  Wiggins .............. G06F 3/04842
10,177,908 B2 *  1/2019  Hamel .................. H04L 9/0822
(Continued)

FOREIGN PATENT DOCUMENTS

WO  2020/142469 A1  7/2020

OTHER PUBLICATIONS

Swanson, Tim. "Watermarked tokens and pseudonymity on public blockchains." Unpublished manuscript, R3CEV (2015). (Year: 2015).*
(Continued)

*Primary Examiner* — Shawnchoy Rahman
(74) *Attorney, Agent, or Firm* — GREENBERG TRAURIG, LLP

(57) ABSTRACT

In some embodiments, the present description provides systems and/or methods including receiving an asset token associated with a source entity, the asset token encoding asset metadata associated with a particular data asset. A query is received from a recipient entity and a similarity measure between the query and the asset metadata of the asset token is determined. A notification is provided to the source entity identifying a matching query to the asset token and a percent match. A source entity response to the notification is received including a consent to interact with the recipient entity. A recipient notification is provided to the recipient entity identifying the particular data asset associated with the asset token and initiating an escalating confidentiality workflow to enable the recipient entity to access private data associated with the source entity for executing a transaction regarding the particular data asset.

20 Claims, 10 Drawing Sheets

Related U.S. Application Data

(60) Provisional application No. 63/147,558, filed on Feb. 9, 2021.

(56) References Cited

U.S. PATENT DOCUMENTS

| | | | |
|---|---|---|---|
| 10,217,185 B1* | 2/2019 | Cabanero | H04L 67/01 |
| 10,911,452 B2 | 2/2021 | Pham | |
| 10,929,842 B1* | 2/2021 | Arvanaghi | H04L 9/3239 |
| 11,228,437 B1* | 1/2022 | Wooster | H04L 9/3226 |
| 2003/0018558 A1* | 1/2003 | Heffner | G06Q 40/02 705/37 |
| 2017/0323087 A1 | 11/2017 | Kline et al. | |
| 2018/0018564 A1* | 1/2018 | Erenrich | G06F 16/3334 |
| 2018/0101874 A1* | 4/2018 | Laski | G06Q 30/0271 |
| 2019/0386969 A1 | 12/2019 | Verzun et al. | |
| 2020/0081923 A1* | 3/2020 | Chan | G09B 5/12 |
| 2020/0273124 A1 | 8/2020 | Shah | |
| 2020/0322151 A1* | 10/2020 | Latimer | H04L 63/10 |
| 2021/0216647 A1* | 7/2021 | Sarhaddar | G06F 21/6218 |
| 2022/0156723 A1* | 5/2022 | Lovato | H04L 9/3236 |
| 2022/0166626 A1* | 5/2022 | Madisetti | H04L 41/40 |
| 2022/0182237 A1* | 6/2022 | Gaur | H04L 9/3247 |
| 2022/0230240 A1* | 7/2022 | Sliwka | G06Q 40/02 |
| 2022/0303258 A1* | 9/2022 | Mee | G06Q 20/36 |
| 2022/0405748 A1* | 12/2022 | Coughlan | G06Q 20/38215 |

OTHER PUBLICATIONS

Faisal, Tooba, Nicolas Courtois, and Antoaneta Serguieva. "The evolution of embedding metadata in blockchain transactions." 2018 International Joint Conference on Neural Networks (IJCNN). IEEE, 2018. (Year: 2018).*

International Search Report and Written Opinion from International Application No. PCT/IB2022/000073 dated Sep. 2, 2022.

* cited by examiner

COMPUTER-BASED SYSTEMS CONFIGURED FOR INTERACTIVE SESSIONS TO AUTOMATICALLY MEDIATE EXECUTIONS RELATED TO CHEMICAL COMPOUNDS/MOLECULES AND/OR ASSOCIATED TECHNOLOGIES AND METHODS OF USE THEREOF

CROSS-REFERENCE TO RELATED APPLICATIONS

This application claims priority to PCT Application No. PCT/IB2022/000073, entitled "COMPUTER-BASED SYSTEMS CONFIGURED FOR INTERACTIVE SESSIONS TO AUTOMATICALLY MEDIATE EXECUTIONS RELATED TO CHEMICAL COMPOUNDS/MOLECULES AND/OR ASSOCIATED TECHNOLOGIES AND METHODS OF USE THEREOF," filed on Feb. 9, 2022, which claims priority to U.S. Provisional Application No. 63/147,558, entitled "TRADING EXECUTION METHODS AND SYSTEMS FOR MOLECULES", filed on Feb. 9, 2021, each of which is incorporated herein in its entirety for all purposes.

FIELD OF TECHNOLOGY

The present disclosure is directed to computer-based systems configured for interactive sessions to automatically mediate execution of transactions related to chemical/biological/other compounds/molecules and/or associated technologies and methods of discovery, research, development, delivery, manufacturing, combination, or use thereof.

BACKGROUND

Electronic exchanges may be systems of hardware and software that may be programmed/configured to utilize servers and/or smart routers to execute digital interactions among their users that may result in exchange of assets, including digital assets.

SUMMARY

In some embodiments, the present description provides an exemplary computer-based system, including: at least one computing device, including a non-transient computer memory, storing program instructions; where, when executing the program instructions, the at least one computing device is programmed to generate and maintain a cloud-based platform having a plurality of capabilities to enable a plurality of interactive sessions between a plurality of users for a plurality of molecules; where the plurality of capabilities include: a capability of automatically controlling anonymity of users within each interactive session for a particular molecule; a capability of automatically executing at least one trained machine-learning model that has been trained to predict at least one of: a match between users related to the particular molecule of the plurality molecules, an evaluation of the particular molecule, and/or a reward potential on at least one product associated with the particular molecule; a capability of automatically utilizing a plurality of API calls to access a plurality of electronic resources to obtain information related to the plurality of molecules, users, or both; and a capability of automatically generating a smart contract in a blockchain-based environment or a non-blockchain-based environment to administer each interactive session of the plurality of interactive sessions between the plurality of users for each particular molecule.

In some embodiments, the present description provides an exemplary computer-based method, including where the plurality of capabilities include: a capability of automatically controlling anonymity of users within each interactive session for at least one particular molecule; a capability of automatically executing at least one trained machine-learning model that has been trained to predict at least one of: a match between users related to at least one particular molecule of the plurality of molecules, an evaluation of at least one particular molecule, or a reward potential on at least one product associated with at least one particular molecule; a capability of automatically utilizing a plurality of API calls to access a plurality of electronic resources to obtain information related to the plurality of molecules, users, or both; and a capability of automatically generating a smart contract in a blockchain-based environment to administer each interactive session of the plurality of interactive sessions between the plurality of users for each particular molecule; and maintaining, by at least one processor, the cloud-based platform to administer each interactive session of the plurality of interactive sessions between the plurality of users for the plurality of molecules.

In some embodiments, the exemplary inventive computer-based systems/platforms, the exemplary inventive computer-based devices, and/or the exemplary inventive computer-based components of the present disclosure may be configured to automatically compare bids to each other and to the ask, based on at least one trained model that has been trained based on a training set, including data from historical bid information from other bids, current bid information from other bids, historical bid action information regarding historical bids, current bid action information regarding historical bids, other suitable historical bidding information, and any other knowledge base historical and/or current data.

In some embodiments, the exemplary inventive computer-based systems/platforms, the exemplary inventive computer-based devices, and/or the exemplary inventive computer-based components of the present disclosure may be configured to automatically track bids and negotiations on a timeline, such as, without limitation, by smart bundling and specification of geographies that are relevant to an asset (e.g., molecule) and/or a deal. In some embodiments, the exemplary inventive computer-based systems/platforms, the exemplary inventive computer-based devices, and/or the exemplary inventive computer-based components of the present disclosure may be configured to automatically integrate messaging between parties, by for example, utilizing at least one natural language processing technique to identify terms that get incorporated automatically in legal documents between parties.

In some embodiments, the exemplary inventive computer-based systems/platforms, the exemplary inventive computer-based devices, and/or the exemplary inventive computer-based components of the present disclosure may be configured to automatically generate, without limitations, deal related presentation (molecule-specific offer-specific presentation graphical user interfaces (e.g., slides, etc.) and/or diligence documents, based at least in part on one or more of the following parameters:
  i) Deal types: licensing, sale, investment, barter deal, marketing/co-marketing, development/co-development, regional/global, discovery/R&D/delivery platform technology license;

ii) NDA;
iii) Term sheet;
iv) Final agreements;
v) All multiple choice, built modularly;
vi) Modular versions/modules; and/or
vii) Any combination thereof.

In some embodiments, the exemplary inventive computer-based systems/platforms, the exemplary inventive computer-based devices, and/or the exemplary inventive computer-based components of the present disclosure may be configured to automatically integrate with parties' and/or third-party data room(s) based at least in part on one or more of deal-specific, bid-specific, and/or molecule-specific access permission attribute.

In some embodiments, the exemplary inventive computer-based systems/platforms, the exemplary inventive computer-based devices, and/or the exemplary inventive computer-based components of the present disclosure may be configured to automatically manage deal flows, by utilizing, without limitation pre-defined smart contracts.

In some embodiments, the exemplary inventive computer-based systems/platforms, the exemplary inventive computer-based devices, and/or the exemplary inventive computer-based components of the present disclosure may be configured to automatically track identify/capture information related to companies' Research and Development pipelines and utilize at least one trained machine-learning model to automatically correlate with reason(s) to deprioritize/consider selling and automatically generation at least one electronic messaging to a respective entity, where at least one electronic message has been pre-configured to allow the respective entity to automatically offer the identified molecule for sale on the platform of the present disclosure. In some embodiments, the exemplary inventive computer-based systems/platforms, the exemplary inventive computer-based devices, and/or the exemplary inventive computer-based components of the present disclosure may include an automated molecule recommendation engine having at least one trained machine-learning model to automatically predict particular alternative molecule candidate(s) that may be similar to or could be a good alternative to other molecule(s) that users of the exemplary platform of the present disclosure have looked at (e.g., browsing history), have marked/tagged and/or bid on.

BRIEF DESCRIPTION OF THE DRAWINGS

Reference is made to the drawings that form a part of this disclosure, and which illustrate embodiments in which the devices and methods described herein can be practiced.

Like reference numbers represent the same or similar parts throughout.

DETAILED DESCRIPTION

Figure 1A:
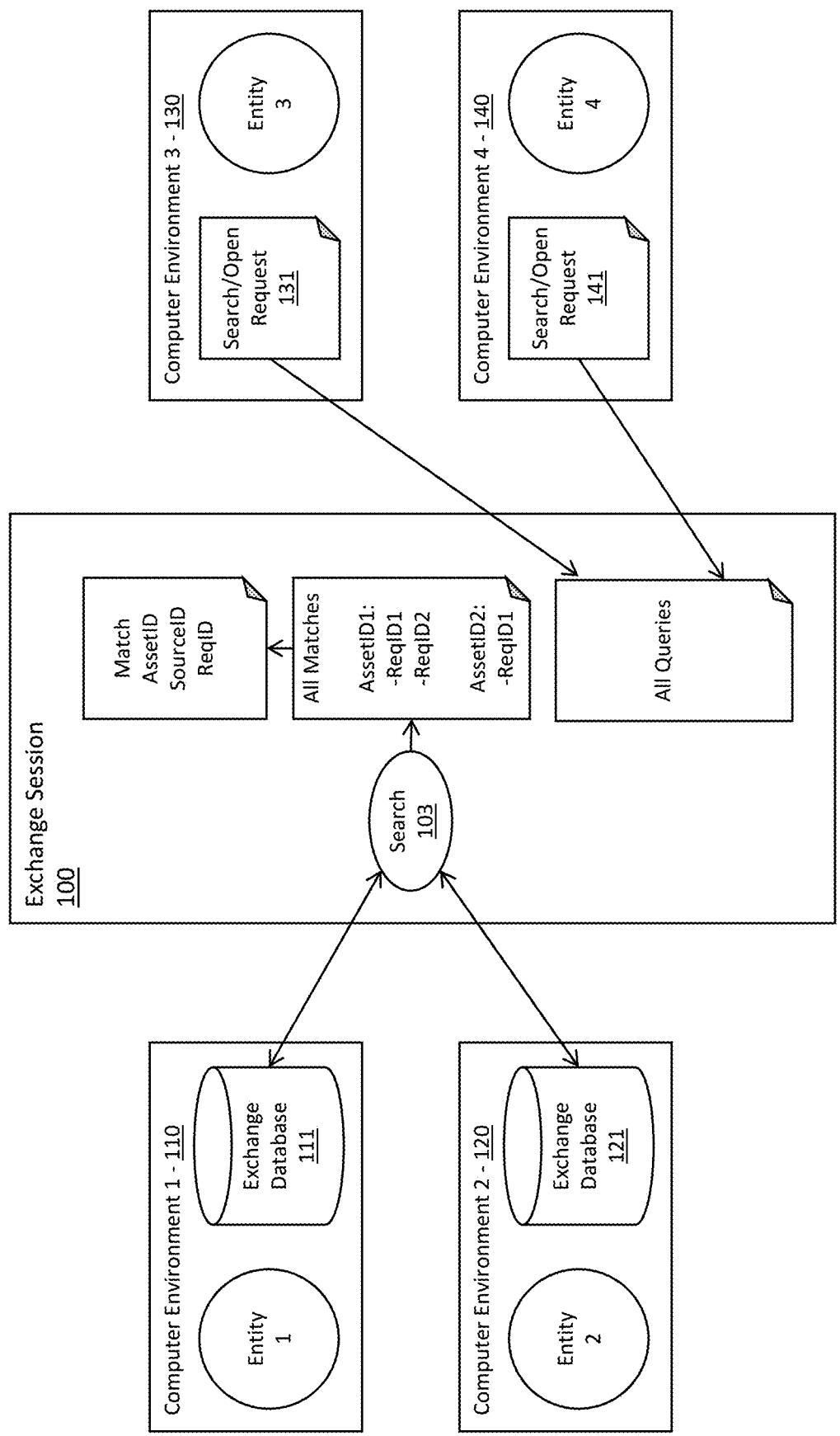
FIG. 1A, FIG. 1B, FIG. 2A, FIG. 2B, FIG. 3, FIG. 4, FIG. 5, FIG. 6, FIG. 7 and FIG. 8 illustrate various aspects of at least some embodiment detailed herein.

Detailed embodiments of the present disclosure are disclosed herein; however, it is to be understood that the disclosed embodiments are merely illustrative of the disclosure that may be embodied in various forms. In addition, each of the examples given in connection with the various embodiments of the disclosure is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Further, for the purposes of describing and claiming the present disclosure the term "smart order router" refers to an electronic system that creates and maintains an internal montage of bids and offers and routes orders to one or more execution venues based on the internal montage.

Further still, for the purposes of describing and claiming the present disclosure the term "notification message" refers to an electronic message that indicates the presence of an order. Examples of information contained in a notification message include (but are not limited to) one or more of the following (and any combination of the following)—for the buyer and/or seller: asset symbol; therapeutic field (e.g. therapy area, indication including specific patient targeting within the above, therapeutic treatment regimen); class; target; type of molecule (e.g. whether it is a small molecule or biologic and/or sub categories within such categories); type of modality (e.g. cell therapy, gene therapy, gene editing, other modalities and/or technologies); platform; molecular structure and/or characteristics including weight, size and others; features such as pegylation and glycosylation; mode of administration; pharmacodynamics and pharmacokinetics characteristics; delivery route and method; trial results including preclinical and/or clinical; information about relevant animal models; differentiation from other molecules in this class/addressing this target/indication; regulatory path and interactions; market information including size and growth; timelines and financing requirements—past and future; information can be numerical, descriptive, illustrative, graphic, image or any other method of display; and/or ask price and/or terms.

Further still, for the purposes of describing and claiming the present disclosure the term "non-displayed priced order" refers to an order to buy or sell at least one molecule, wherein the presence of the order is known only by the execution venue where the order is and through the transmission of one or more notification messages to one or more smart order routers only for the purpose of incorporation into the internal montages of each of the smart order routers. For example, the non-displayed priced order may the an order instruction where the order price is calculated based on the best bid, best ask, mid-point or last sale price in the market ("reference price") and may or may not include a spread relative to the reference price.

Further still, for the purposes of describing and claiming the present disclosure the term "molecule" refers to any partial/full ownership, exclusive/non-exclusive license or creditorship interest, index, contract, or transaction, such as a forward, futures, option, put, call, collar, swap, group, or index of molecules and/or any combination thereof, group or index of molecules (including any interest therein or based on the value thereof). Further the term "molecule" includes, but is not limited to, a biological compound, a chemical compound, gene, cells or cell line or partial cell, therapeutic field (e.g. therapy area, indication including specific patient targeting within the above, therapeutic treatment regimen); class; target; type of molecule (e.g. whether it is a small molecule or biologic); type of modality (e.g. cell therapy, gene therapy, gene editing, other modalities); platform; molecular structure and/or characteristics including weight, size and others; features such are pegylation and glycosylation; mode of administration; pharmacodynamics and pharmacokinetics characteristics; delivery route and method; trial results including preclinical and/or clinical; information about relevant animal models: differentiation from other molecules in this class/addressing this target/indication; regulatory path and interactions; and/or any combination thereof.

Further still, in some embodiments, for the purposes of describing and claiming the present disclosure, the term "member" refers to an entity that has entered into an agreement to use the execution venue for database purposes, whereby the member has access to the GUI of the execution venue.

Further still, in some embodiments, for the purposes of describing and claiming the present disclosure, the term "trader" refers to an individual within a member who has been authorized by the member's system administrator to access the execution venue for database (whereby the trader has access to the GUI of the execution venue).

Further still, in some embodiments, for the purposes of describing and claiming the present disclosure, the term "streaming liquidity provider" refers to a broker or other entity that has entered into an agreement to route orders to the execution venue, whereby the streaming liquidity provider does not have access to the GUI of the execution venue to view orders of the execution venue.

Among those benefits and improvements that have been disclosed, other objects and advantages of this disclosure will become apparent from the following description taken in conjunction with the accompanying figures. The figures constitute a part of this specification and include illustrative embodiments of the present disclosure and illustrate various objects and features thereof.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), software/data/analytics platforms including such developed by others, etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website or webpage, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 2, at least 5, at least 20, at least 50, at least 75, at least at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., a mobile app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative, and not restrictive.

As used herein, the term "user" or "trader" shall have a meaning of at least one user. In some embodiments, the terms "user", "trader" "consumer" or "customer" should be understood to refer to a user of an application or applications as described herein and/or a consumer of data supplied by a data provider. By way of example, and not limitation, the terms "user" or "trader" can refer to a person who receives data provided by the data or service provider over the Internet in a browser session or can refer to an automated software application which receives the data and stores or processes the data.

In some embodiments, users can be, but are not limited to, traders, representing physical end users, custodians, hedge funds, proprietary algorithmic trade execution firms, pharma, biotech companies, entrepreneurs, incubators, venture capital, other investment or debt/royalty firms, academia, other parties researching, developing, commercializing investing in and/or otherwise cultivating therapeutics and tools and methods pertaining therefore, and any combination thereof.

As used herein, a "financial instrument" refers to an equity ownership, debt, or credit, typically in relation to a corporate or governmental entity, where the financial instrument is typically traded via one or more financial trading venues. In some embodiments, "financial instruments" can include, but are not limited to, at least one molecule as defined herein.

In some embodiments, exemplary inventive computer-based systems/platforms, exemplary inventive computer-based devices, and/or exemplary inventive computer-based components of the present disclosure may be configured to operate as an intermediate in matching broker(s) and aggregator(s) of liquidity on one or more of exchange-like venue (e.g., NYSE, CME) and/or one or more of off-exchange-like venue (e.g., dark pool). In some embodiments, the instant inventive platform can aggregate/receive quotes, also called "indications of interest" (MI) by various means (e.g., smartphone, Internet, specialized computer interface, etc.).

Figure 1B:
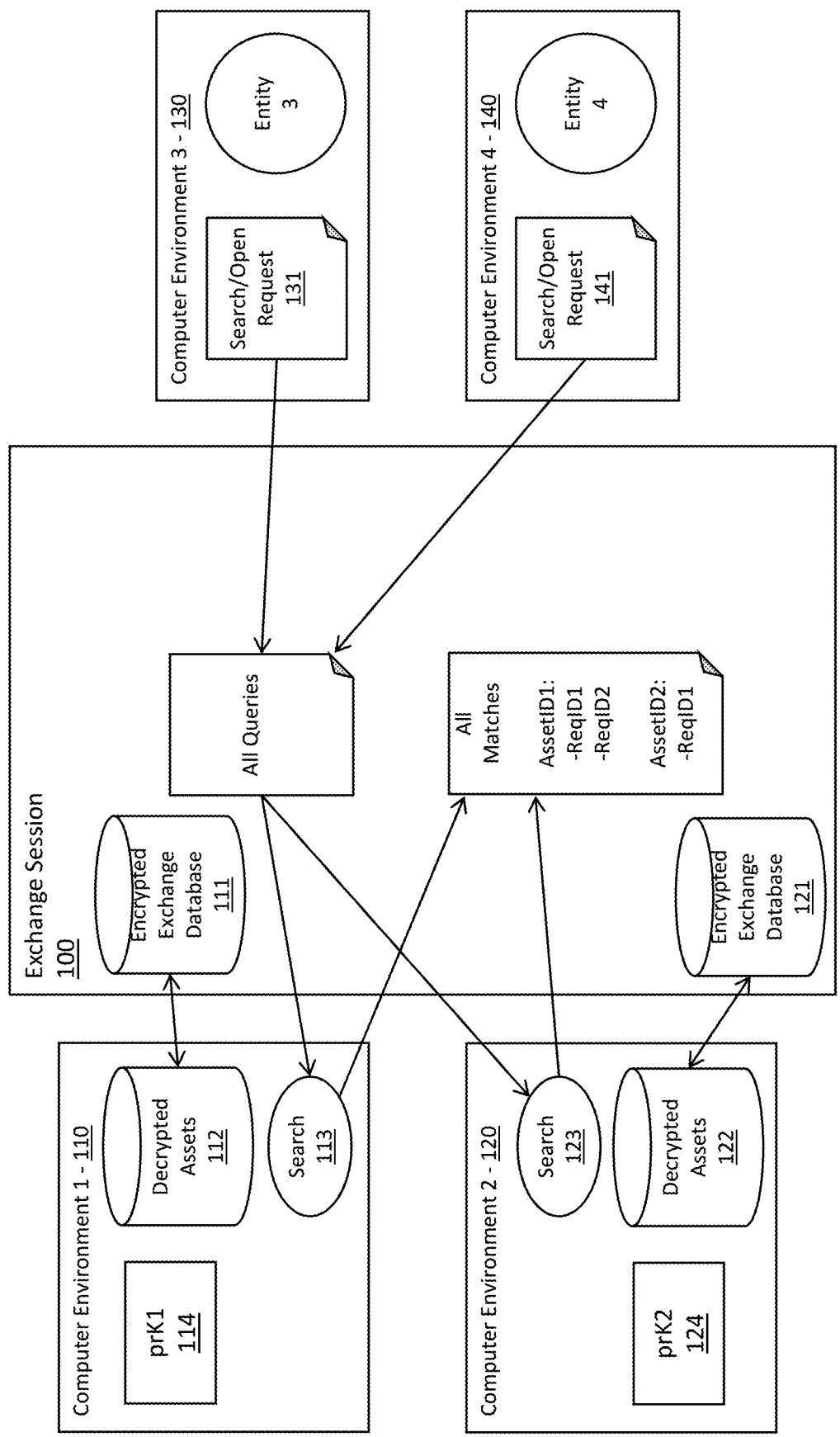

FIGS. 1A and 1B illustrate a system and/or platform for interactive sessions using encrypted data in accordance with aspects of one or more embodiments of the present disclosure.

In some embodiments, users of an exchange session 100 may access the exchange session 100 from one or more computing environments in order to participate in secure and confidential interactive sessions without disclosing private data. In some embodiments, a computer environment refers to one or more software and/or hardware components that provide functionality accessible from a computing device. A computer environment may include computing resources and/or software local to the computing device, computing resources and/or software remote from the computing device and delivered as, e.g., a service and/or download, or any combination thereof.

In some embodiments, the exchange session 100 may facilitate the execution of interactions for data assets, such as, e.g., computer files, digital tokens, digital media, financial assets, currency, intellectual property, proprietary data (e.g., molecules, recipes, chemical formulas, etc.). Each of the computer environments may communicate with the exchange session 100, and the exchange session 100 may match data assets to searches and/or open requests for data assets, e.g., according to an asset identifier ("AssetID") identifying each data asset, a source identifier ("SourceID") identifying a source user providing each data asset, a request identifier ("ReqID") identifying each search/open request, among other data.

Data assets may be exchanged on the exchange session 100 with varying stages of confidentiality and/or anonymity throughout an exchange of data assets. A source entity has the ability to choose whether to respond to a particular search query and control and/or evolve anonymity up until execution of the interaction. The source entity can expose her data asset to search queries without visibly listing the data asset, thus creating hidden listings. The hidden listings include a token kept by the source entity to identify the data asset and data asset metadata, while the data asset metadata is listed for searching via the search query. The search query can search through the data asset metadata to identify a match and presented to the source entity showing the extent of match as a percentage or color or any other metric. The source entity can accept and proceed with the query, reject, ignore, or park it or take any other action, as she sees fit. Upon accepting a search query, the source entity may reveal its identity, but maintain confidentiality of the data. The source entity may then reveal the data to the other party gradually or at once to finalize and execute the interact to, e.g., exchange the data asset or perform any other suitable operation on the data asset as requested by the recipient.

In some embodiments, the hidden listings may be revealed to the participating entities upon the performance of certain tasks. For example, a listing may initially be hidden, but once a recipient entity's search and/or open request for a data asset is matched to the hidden listing, the recipient entity may be revealed to the source entity and/or the source entity may be revealed to the recipient entity. For example, the signing of a non-disclosure agreement, confidentiality agreement, or other task may enable the recipient entity to be revealed to the source entity and/or the source entity to be revealed to the recipient entity. In another example, providing consent to participate in an exchange may reveal the data asset but not the entities. Other arrangements of progressive confidentiality may be employed.

In some embodiments, the identity of an entity may be hidden but entity attributes may be visible. For example, a type or industry of an entity may be classified and/or characterized according to, e.g., an organization type (e.g., pharmaceutical company, biotech company, academia, investor, hedge fund, real estate owner, company type, etc.), a size of the organization (e.g., number of employees, market capitalization, etc.), whether the organization is public or private, among other characterizations. In some embodiments, activity of an entity may also be visible, such as, e.g., deal activity on and off the exchange session 100, products and/or services on the market, etc. In some embodiments, expertise and/or qualifications of the entity may be visible, such as, e.g., publications, awards, other products and/or services, among other indications of competency and expertise or any combination thereof.

In some embodiments, the data asset metadata may include, e.g., descriptors of various aspects of the data asset. For example, for a molecule, the data asset metadata may include, e.g., a structure, a binding, a formulation, a target, a weight, a stability, a stage, an indication, an intellectual property (IP) age, a modality, a delivery, news and/or deals related to the molecule, etc. In some embodiments, for a financial instrument, the metadata may include, e.g., an instrument type, a value, a position, news and/or deals related to the instrument, etc.

In some embodiments, the data asset metadata may be enriched from additional sources of data. For example, the exchange session 100 may pull and/or scrape data from sources such as, e.g., a product pipeline (e.g., a pharmaceutical pipeline), publications (e.g., research papers, press releases, etc.), asset, deal and/or statistics databases, intellectual property filings, clinical data, regulatory information, news, SEC filings, among other data sources or any combination thereof. In some embodiments, the additional sources may include, e.g., a publicly accessible database, an entity database for which the entity has access, a website, a content delivery network, or other suitable additional source of data related to the data asset. In some embodiments, the exchange session 100 may access a website associated with the sources and scrape information from the website to pull the data. In some embodiments, the exchange session 100 may enrich data asset data periodically and/or upon listing of the data asset for exchange. In some embodiments, periodically enriching the data asset data may include a period of, e.g., every hour, every two hours, every three hours, every four hours, every five hours, every six hours, every twelve hours, every twenty four hours, every two days, every three days, every four days, every five days, every six days, every week, or any other suitable period in the range of fifteen minutes to one month.

Accordingly, in some embodiments, source entities, e.g., Entity 1 and Entity 2, may interact with recipient entities, Entity 3 and Entity 4 via the exchange session 100 using the varying stages of confidentiality. In some embodiments, the source entities may communicate with the exchange session 100 via a respective computer environment 1 110 and computer environment 2 120. Similarly, the recipient entities, Entity 3 and Entity 4, may communicate with the exchange session 100 via a computer environment 3 130 and a computer environment 4 140, respectively.

In some embodiments, the computer environment 1 110 may include an exchange database 111 configured to provide data assets and/or metadata of data assets to the exchange session 100 in a confidential manner. For example, the exchange database 111 may include encryption such that permission by Entity 1 would be required to access the data assets and/or the metadata.

In some embodiments, the exchange database 111 may be local to the computer environment 1 110 of the Entity 1 (see, e.g., FIG. 1A). In some embodiments, rather than being local to the computer environment 1 110, the exchange database 111 may located remotely from the computer environment 1 110, e.g., at the exchange session 100 (see, FIG. 1B). In some embodiments, where the exchange database 111 is remote from the computer environment 1 110, the computer environment 110 may access decrypted assets 112 by querying the exchange database 111 and decrypting returned data with a private key (prK1) 114. In some embodiments, the data assets may be encrypted in the exchange database 111 where the exchange database is remote from the computer environment 1 110, local to the computer environment 1 110 or any combination thereof.

Similarly, in some embodiments, the computer environment 2 120 may include an exchange database 121 configured to provide data assets and/or metadata of data assets to the exchange session 100 in a confidential manner. For example, the exchange database 121 may include encryption such that permission by Entity 2 would be required to access the data assets and/or the metadata.

In some embodiments, the exchange database 121 may be local to the computer environment 2 120 of the Entity 2 (see, e.g., FIG. 1A). In some embodiments, rather than being local to the computer environment 2 120, the exchange database 121 may located remotely from the computer environment 2 120, e.g., at the exchange session 100 (see, FIG. 1B). In some embodiments, where the exchange database 121 is remote from the computer environment 2 120, the computer environment 2 120 may access decrypted assets 122 by querying the exchange database 121 and decrypting returned data with a private key (prK2) 124. In some embodiments, the data assets may be encrypted in the exchange database 121 where the exchange database is remote from the computer environment 2 120, local to the computer environment 2 120 or any combination thereof.

In some embodiments, each of the computer environment 1 110 and the computer environment 2 120 may interact with the exchange session 100 to respond to queries for data assets from potential recipient entities via, e.g., search 113 and/or search 123, respectively. In some embodiments, the search 113 may operate locally and/or via a private connection to the computer environment 1 110. In some embodiments, the data assets and/or identity of the Entity 1 may include private data or other sensitive information. Thus, to ensure that the Entity 1 maintains control and security of the data, the search 113 may be provided with search queries and/or open requests for data assets from each recipient entity. The computer environment 1 110 may employ the search 113 to perform searches in Entity 1's data assets, e.g., in the data of the exchange database 111. Thus, the computer environment 1 110 may determine matching queries via the search 113 without leakage of data and/or other information. Similarly, the computer environment 2 120 may employ the search 123 to perform searches in Entity 2's data assets, e.g., in the data of the exchange database 121 mine matching queries of potential recipient entities without disclosing or leaking any sensitive data or other information.

In some embodiments, the searches and/or open requests may be provided to the exchange session 100 by one or more potential recipient entities, e.g., Entity 3 and Entity 3. In some embodiments, the computer environment 3 130 of Entity 3 and the computer environment 4 140 of Entity 4 may submit queries in the form of a search or an open request or both. In some embodiments, a search includes a search for existing data assets open for exchange. In some embodiments, the search may be submitted to each computer environment 110-120 associated with a source entity (e.g., Entity 1 through Entity 2), that is available to response (e.g., logged in, online, or otherwise available or any combination thereof) at a time of the search. In some embodiments, an open request may include a posting to the exchange session 100 that may persist until it is met by a response from a source entity. As such, the open request may be submitted to each computer environment 110-120 for search until the open request is responded to, or until the associated recipient entity removes the open request.

In some embodiments, the computer environment 3 120 may submit search/open request 131 as a query for one or more data assets satisfying specified parameters. In some embodiments, where the exchange session 100 searches the exchange databases 111 and 121 (see, FIG. 1A), the exchange session 100 may use a search 103 function. Based on the parameters associated with the search/open request 131, the search 103 may identify similar data assets.

In some embodiments, the exchange session 100 may present suggested query parameters to the computer environment 3 130 and/or the computer environment 4 140. For example, based on previous searches and/or open requests and previous matches and executed exchanges, the exchange session 100 may use one or more machine learning models to generate the suggested query parameters including, e.g., suggested terms per data asset in question, data asset parameters for which entities that looked for data assets similar to a data asset in question also searched, terms per data asset and/or exchange type, profiles of various entities and their activity, one or more heat maps indicating trending data assets and/or data asset types, among other suggested query parameters or any combination thereof. Herein, "term" refers to attributes and/or parameters defining an exchange of a particular data asset. Accordingly, the exchange session 100 may recommend to one or more entities terms for a particular exchange based on each entities history of exchanges, terms for a particular exchange based on a history of exchanges for the same or similar data asset, similar data assets based on the asset metadata, recommended assets based on the asset metadata and a history of other entities viewing other data assets, among other recommendations or any combination thereof.

In some embodiments, the exchange session 100 may be configured to utilize one or more exemplary AI/machine learning techniques for the suggestions, the AI/machine learning techniques chosen from, but not limited to, decision trees, boosting, support-vector machines, neural networks, nearest neighbor algorithms, Naive Bayes, bagging, random forests, collaborative filtering, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) define Neural Network architecture/model,
ii) transfer the input data to the exemplary neural network model,
iii) train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, similarity may be measured according to a similarity metric or similarity measure, such as, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measures or any combination thereof. The similarity measure may determine a percent match between the search/open request 131 and each data asset in each of the exchange database 111 and the exchange database 121. In some embodiments, data assets having a match percentage greater that a predetermined threshold match percentage or a position in the ranked data assets greater than a predetermined ranking.

In some embodiments, where each computer environment 110 and 120 searches the exchange databases 111 and 121, respectively (see FIG. 1B), the exchange session 100 may submit the search/open request 131 to each computer environment 110 and 120. Each of computer environment 1 110 and computer environment 2 120 may then separately search for similar data assets to the parameters associated with the search/open request 131. Based on the parameters associated with the search/open request 131, each of the search 113 and the search 123 may separately identify matching data assets from exchange database 111 and exchange database 121, respectively as described above. Each of the search 113 and the search 123 may provide the matching data assets to the exchange session 100.

In some embodiments, the matching data assets may be returned to the computer environment 3 130 with data asset parameters including, e.g., match percentage, AssetID, metadata, or any other parameters or any combination thereof. In some embodiments, the data asset parameters may be provided to the computer environment 3 130 without a SourceID or other private, sensitive, proprietary, or other confidential data.

Similarly, computer environment 4 140 may submit a search/open request 141 to the exchange session 100 to search for data assets. As described above, the exchange session 100 may employ the search 103 and/or provide the query to each of the computer environment 1 110 and the computer environment 2 120 to each the exchange databases 111 and 121. Based on a similarity between the parameters of the query and data asset parameters of each data asset, data assets satisfying the match percentage threshold and/or a rank threshold may be returned to the computer environment 4 140 as matching data assets without disclosing a SourceID or other private, sensitive, proprietary, or other confidential data.

For example, a first data asset AssetID1 may be determined to match a first request ReqID1 submitted by search/open request 131 as well as to a second request ReqID2 submitted by the search/open request 141. Meanwhile, a second data asset AssetID2 may be determined to match the first request ReqID1 but no the second request RefID2. Thus, the exchange session 100 may send an alert to each of the computer environment 3 130 and the computer environment 4 140 indicating the match to the first data asset AssetID1, while the exchange session 100 may send an alert to only the computer environment 3 130 indicating the match to the second data asset AssetID2.

In some embodiments, where the data asset is a molecule, the asset metadata may include, e.g., a molecular structure of the molecule. Thus, searches for molecules may also include queries specifying a molecular structure, such as, e.g., a three-dimensional model of a molecule, molecular bonds and/or molecular bond configurations, a structural formula, among other representations of a molecular structure or any combination thereof. In some embodiments, the molecular structure of a query may be compared to the molecular structure of the data asset to determine a match. In some embodiments, the match may include, e.g., an exact match or not a match, a percentage match based on common substructures of the molecular structures (e.g., having common fatty acid compositions, etc.), or other techniques for determining commonalities.

In some embodiments, the alert may enable the associated entity to participate in an escalating identification process to execute an exchange with the matching data asset. In such an escalating identification process, an escalating set of data from each of the source entity and the recipient entity in the exchange may be exchanged based on certain benchmarks and/or stages being performed. For example, upon being alerted of one or more matching data assets, Entity 3 at the computer environment 3 130 may select to execute an exchange of the first data asset AssetID1. Upon the Entity 3 submitting certain predefined items, data and/or information, a SellerID or other identifying data associated with the first data asset AssetID1 may be delivered to the computer environment 3 130. Other stages of escalating identification may be performed as described further with reference to FIG. 2A-2B and FIG. 8 below.

In some embodiments, the exchange session 100 may utilize previously executed exchanges and general industry information to tokenize data assets with standardized terms according to each particular data asset and/or exchange type. Thus, a recipient entity may select an option in the alert to execute an exchange according to a tokenized data asset associated with matching data asset.

Figure 2A:
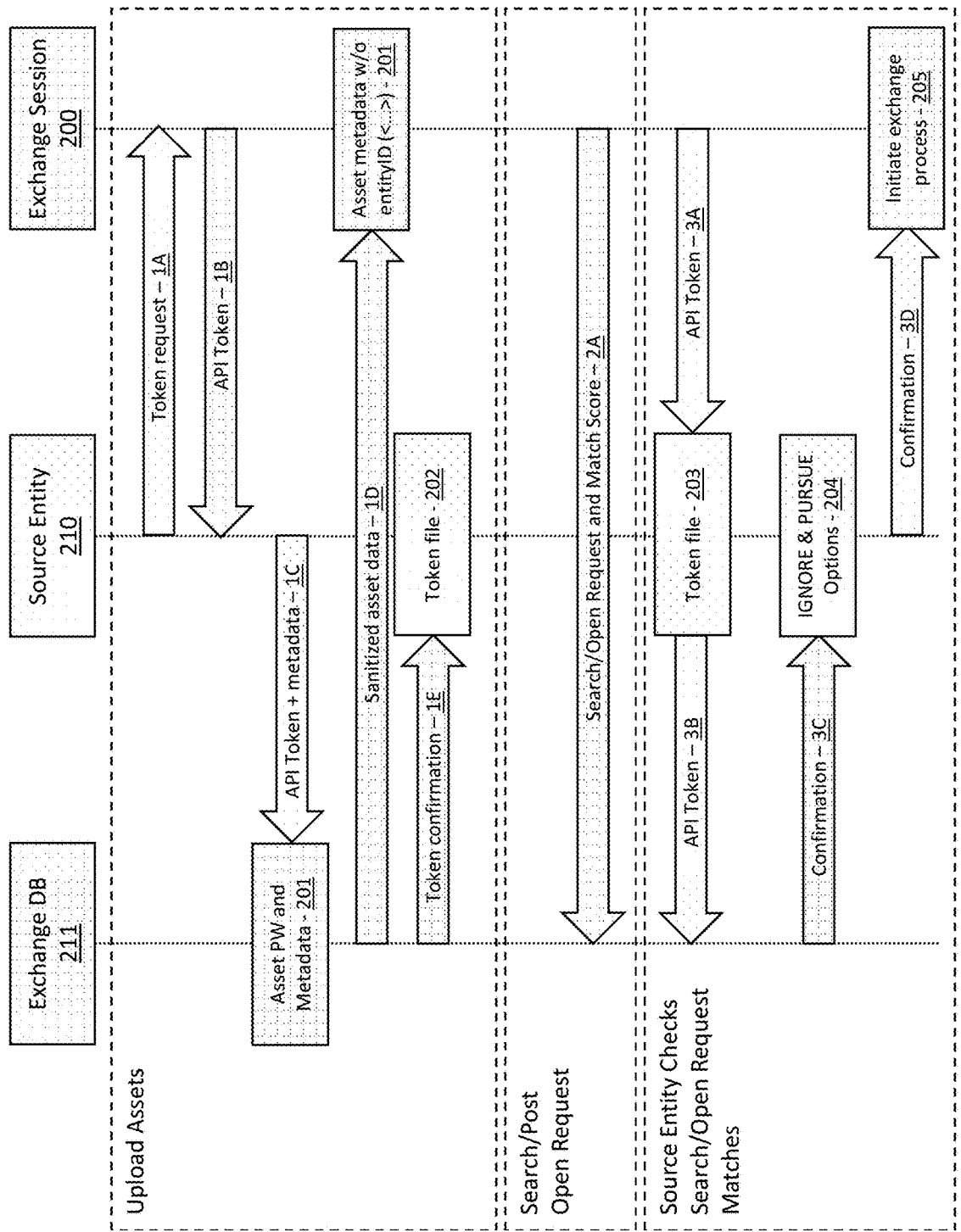
Figure 2B:
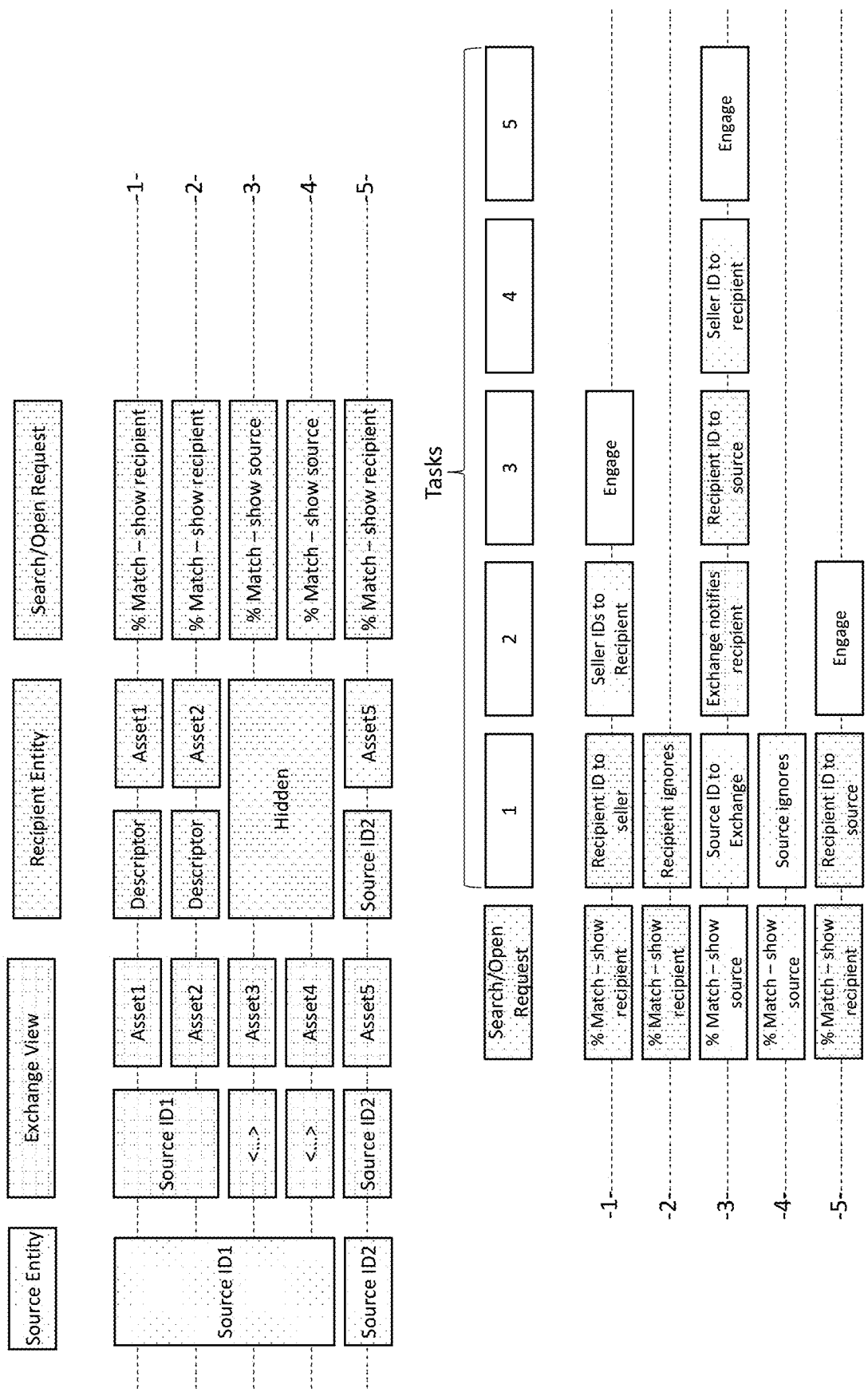

FIGS. 2A and 2B illustrates interactive sessions using encrypted data on the system and/or platform in accordance with aspects of one or more embodiments of the present disclosure.

In some embodiments, matching available data assets to data asset search queries would typically require specific details concerning the data assets and/or sellers ("source entities") of the data assets to be made available to potential buyers ("recipient entities"). However, such details may be confidential, sensitive, proprietary, or otherwise private. Maintaining the security and confidentiality of the private data while enable a search of the data assets is a technical challenge solved by the systems and methods described herein.

In some embodiments, to make data assets available for exchange, a source entity 210 may interact with an exchange session 200 to enable searching of private data in an exchange database 211 associated with the source entity 210. Thus, as shown in FIG. 2A, a hidden listing of a data asset may be subject to an interaction for an exchange without sharing data asset and/or entity data.

In some embodiments, to make the data assets available, the source entity 210 may initiate an upload of assets to the exchange database 211 and the exchange session 200. The upload assets portion may include the source entity 210 logging in to the exchange session 200 and input a request for an API token at 1A to access the exchange database 211. In some embodiments, the API token may include, e.g., any suitable token for verification that the source entity 210 is accessing the exchange database 211 via the exchange session 200. In some embodiments, the API token may include a cryptographic token, e.g., signed with a private key by the source entity 210, the exchange session 200 or both.

In some embodiments, the exchange session 200 may return an API token at 1B to enable the source entity 210 to access the exchange database 211. Accordingly, the source entity 210 may send the API token at 1B to the exchange database 211 via a suitable API. In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. The API token 1B may include the use of any suitable API, such as, e.g., REST API, reactive architecture, service-oriented, or any other suitable architectural pattern of the API.

For example, upon issuing the API token at 1B, the exchange session 200 may log the source entity 210 out of exchange session 200 and redirect the source entity 210 to the exchange database 211 along with the API token at 1B. In some embodiments, the use of the API token enables access to exchange database 211 without requiring any identifying information of the source entity 210 to be provided to the exchange database 211.

In some embodiments, upon accessing the exchange database 211 at 1C, the source entity 210 may upload metadata (not the full asset data) associated with a particular data asset or data assets. In some embodiments, the data asset metadata may include, e.g., descriptors of various aspects of the data asset. For example, for a molecule, the data asset metadata may include, e.g., a structure, a binding, a formulation, a target, a weight, a stability, a stage, an indication, an intellectual property (IP) age, a modality, a delivery, news and/or deals related to the molecule, etc. In some embodiments, for a financial instrument, the metadata may include, e.g., an instrument type, a value, a position, news and/or deals related to the instrument, etc.

In some embodiments, the data asset metadata may be enriched from additional sources of data. For example, the exchange session 200 may pull data from sources such as, e.g., a product pipeline (e.g., a pharmaceutical pipeline), publications (e.g., research papers, press releases, etc.), asset, deal and/or statistics databases, intellectual property filings, clinical data, regulatory information, news, SEC filings, among other data sources or any combination thereof.

The metadata for a data asset representing a molecule may include, e.g., target, indications, phase, etc. The metadata for a data asset representing a financial instrument may include, e.g., instrument type, liquidity, prices, etc. The metadata for intellectual property may include, e.g., technical field, artistic field, subject, target solution, prosecution status, intellectual property type (patent, patent application, trademark, trade secret, copyright, etc.), etc. In some embodiments, the data assets themselves may be stored in a separate database, e.g., without a reference to the source entity 210.

In some embodiments, the source entity 210 may also create an asset password (PW) for the data asset(s) associated with the metadata. In some embodiments, the asset PW may include, e.g., an AssetID, the metadata, a user selected word, number or other set of characters, or any other suitable information.

In some embodiments, the asset PW may be encrypted to form an asset token. In some embodiments, the asset token may include, e.g., a private key associated with the exchange session 200, the source entity 210 or both. In some embodiments, the asset token may also include, e.g., linked to the asset token and/or encoded in the asset token file 202, additional identifying information identifying the data asset and/or the location of the data asset and/or attributes of the data asset (e.g., the data asset metadata). For example, the asset token file 202 may include, e.g., a database ID associated with the exchange database 211, a verification signature (e.g., by the exchange database 211), a random string (e.g., having 16 bytes, 32 bytes, 64 bytes, 128 bytes, 256 bytes, or more), among other data for generating a secure token to enable access to the data asset. Thus, access to the data asset may secured using the asset token.

In some embodiments, upon creating the asset token file 202 and storing the data asset, the exchange database 211 may sanitize asset data by, e.g., stripping a source entity identifier, asset details, and any other private information. Thus, the exchange database 211 may provide to the exchange session 200 the asset token file 202 including the asset data at 1D, including asset metadata, without exchanging the source entity identifier for use in searches. In some embodiments, the asset metadata may not be made visible to recipient entities but may be exposed for searches and/or open requests or other queries for data assets.

In some embodiments, concurrently with providing the asset information to the exchange session 200, the exchange database 211 may provide a token confirmation 1E to the source entity 210 providing the asset token. In some embodiments, the source entity 210 may log the asset token file 202 based on the token confirmation 1E. In some embodiments, the asset token file 202 may include, e.g., a spreadsheet, a table, a data array, a comma-separated-values (CSV) file, a cryptographically hashed data structure, or other suitable data structure for encoding the asset metadata.

In some embodiments, FIG. 2A depicts an asset listing arrangement include a stealth or hidden listing where the asset token file 202 is listed on the exchange session 200 without an entity ID associated with the source entity 210 and without making the listing visible to any recipient entity. Thus, the source entity 210 identity is hidden not just from recipient entities, but from the exchange session 200 itself, while the asset token file 202 listed on the exchange session 200 is hidden from the recipient entities. In some embodiments, other arrangements are possible. For example, a transparent listing is possible where the asset token file 202 include the entity ID associated with the source entity 210, and the asset token file 202 is exposed or otherwise made visible to recipient entities. In some embodiments, hybrid stealth/transparent listings are possible. For example, the asset token file 202 may include the entity ID associated with the source entity 210, but instead of making the entity ID visible to the recipient entities, the exchange session 200 may hide the entity ID and replace it with a descriptor that characterizes the source entity 210. Such descriptors may include, e.g., an organization type (e.g., pharmaceutical company, biotech company, academia, investor, hedge fund, real estate owner, company type, etc.), a size of the organization (e.g., number of employees, market capitalization, etc.), whether the organization is public or private, among other characterizations, deal activity on and off the exchange session 200, products and/or services on the market, publications, awards, other products and/or services, among other indications of descriptors or any combination thereof. Alternatively, the asset token file 202 may include the descriptor(s) instead of the entity ID for the hybrid stealth/transparent listing. In such hybrid stealth/transparent listings and/or transparent listings, the source entity 210 may upload the asset ID and asset metadata without encoding the asset ID and asset metadata in the asset token file 202, but rather list the asset using a suitable web or application portal such that the exchange session 200 may selectively hide data about the source entity 210 from recipient entities.

In some embodiments, to access/edit the exchange database 211, the source entity 210 needs to present the asset token or a set of asset tokens. The asset token is the only way to access the data asset, and thus if the source entity 210 loses the asset token, may no longer be able to access the data asset.

In some embodiments, the exchange database 211 may use the signature to verify whether the token is tampered with, and may decrypt the asset token to retrieve the exchange database 211 database ID. Thus, the exchange database 211 may provide the exchange database 211 details in the clear so the source entity may access and/or edit the data asset.

In some embodiments, the token file 202 and/or the asset ID and asset metadata, being listed on the exchange session 200 enables a search/post open request phase of an exchange. In some embodiments, when a potential recipient entity uploads or otherwise posts a search and/or open request for data assets, the exchange session 200 may send the search and/or open request to the run a search for data assets listed in the exchange session 200. Accordingly, the exchange session 200 may compare query parameters of the search and/or open request to the asset metadata 201.

In some embodiments, to perform the search, the exchange session 200 may store the search and/or open request, e.g., the keywords or other query parameters, to periodically perform a batch search across all data assets listed on the exchange session 200. In some embodiments, the search may be in real-time upon receiving the search and/or open request, but to perform searches more efficiently across many source entities and recipient entities, the exchange session 200 may batch the queries. In some embodiments, the batch searches may be performed according to any suitable period, such as, e.g., one minute, two minutes, five minutes, ten minutes, 15 minutes, 20 minutes, 25 minutes, 30 minutes, one hour, two hours, three hours, four hours, six hours, 12 hours, 24 hours, or any other suitable period in the range from one second to one week.

In some embodiments, a record of potential matches to the query parameters may be stored for each asset metadata 201. In some embodiments, the record of the query parameters may specify, e.g., the keyword(s) or other parameters, a match score to the asset metadata 201, an identifier (ID) identifying the potential recipient entity, a timestamp associated with the query, among other data or any combination thereof. For example, a record may include a data structure such as, e.g., {keyword, match score, buyer ID, timestamp} or other suitable structure.

In some embodiments, the exchange session 200 may provide the record of the query to the exchange database 211 at 2A. The source entity 210 may thus periodically access the exchange database 211 to access the data asset, e.g., using the asset token as described above, to check for the record indicating a match to the data asset. For example, when there is one or more matches to one or more data assets, instead of the edit a screen a list of data assets is presented to the source entity 210 with match statistics such as the match probability.

In some embodiments, where a transparent or a hybrid stealth/transparent listing is used, the match percentage may first be shown to the recipient entity because the recipient entity has visibility into the asset ID and asset metadata. Thus, the exchange session 200 may show the results of the recipient entity's search/open request, including the match percentage to the asset token file 202 (or any other suitable asset data), allowing the recipient to select to pursue an exchange or to ignore the match.

In some embodiments, in the stealth/hidden listing of FIG. 2A, the source entity 210 can decide to list a data asset as a regular asset on exchange session 200. In some embodiments, a regular asset may include the data asset and parameters of the data asset listed on the exchange session 200 rather than asset metadata 201. Thus, a potential recipient could then place an offer for an exchange of the data asset to the source entity 210.

In some embodiments, to list the regular asset, the source entity 210 may upload the asset token to the exchange session 200 (e.g., without identifying information associated with the source entity 210) along with exchange session 200 log in credentials. In some embodiments, the login credentials logs the source entity 210 into the exchange session 200 to create a draft of the regular asset. In some embodiments, the source entity 210 may specify in the draft the data asset and/or the asset token associated with the asset metadata 201. While in the draft, the regular asset is not viewable by potential recipient entities. But once the source entity 210 selects to submit, publish, etc. the regular asset, the asset token and any other user provided details may be listed on the exchange session 200 for viewing by potential recipient entities.

In some embodiments, once the regular asset is listed, the exchange session 200 may determine the recipient entities associated with the matching queries to the asset metadata 201. Upon identifying the recipient entities, the exchange session 200 may automatically alert the potential recipients having the matching queries with a notification that a new asset that matches previous queries has appeared on exchange session 200. In some embodiments, the notification may include a link to the regular asset, after which the regular exchange session 200 process or workflow of escalating confidentiality can start.

In some embodiments, the escalating confidentiality workflow may progress along stealth/hidden listing arrangement 3 in FIG. 2B and may start with a particular recipient user selecting the link. In some embodiments, the link triggers the asset token to the exchange database 211. In some embodiments, the link may reference the asset token in the token file 203. Thus, the link may trigger a request at 3A to the token file 203. The request may access the asset token and/or the asset PW in the token file 203, which the source entity 210 computer environment may sent to the exchange database 211 at 3B. In some embodiments, a token confirmation may be returned to the source entity 210 at 3C. The token confirmation may specify the asset ID associated with the data asset. Accordingly, the computer environment of the source entity 210 may present ignore and/or pursue options 204. The source entity 210 may then select to either pursue an exchange regarding the data asset or to ignore the request. In some embodiments, as shown in listing arrangement 3 of FIG. 2B, upon selecting to pursue, the confirmation may be provided at 3D to the exchange session 200 providing a confirmation of the request and the specifying the source entity identifier to the exchange session 200. Thus, the exchange session 200 may notify the recipient entity of the confirmation upon completion of stage 2, provide the recipient ID to the source entity 210 upon completion of stage 3, and provide source ID to the recipient entity upon completion of stage 4. In some embodiments, the exchange of identifying information may trigger an initiation of the exchange process 205 and allow the source entity 210 and the recipient entity to engage. As shown in stealth/hidden listing arrangement 4 of FIG. 2B, where the source entity 210 selects to ignore the request, the listing arrangement ends.

In some embodiments, as shown in FIG. 2B other listing arrangements may be performed for escalating confidentiality. In hybrid stealth/transparent listing arrangements 1 and 2, the source entity 210 has a Source ID1, which is provided to and visible on the exchange session 200. The Source ID1, however, may be hidden from the recipient entity. Instead, the recipient entity may have a view of a descriptor characterizing the source entity, such as, e.g., an organization type (e.g., pharmaceutical company, biotech company, academia, investor, hedge fund, real estate owner, company type, etc.), a size of the organization (e.g., number of employees, market capitalization, etc.), whether the organization is public or private, among other characterizations, deal activity on and off the exchange session 200, products and/or services on the market, publications, awards, other products and/or services, among other indications of descriptors or any combination thereof. For example, the asset token provided by the exchange database 211 at step 1D above may include, e.g., linked to the asset token and/or encoded in the asset token, the source entity descriptors/characterizations.

In some embodiments, both the recipient entity and the exchange session 200 may have access to the data asset listed by the source entity (e.g., Asset1) and/or metadata thereof. For example, the asset token provided by the exchange database 211 at step 1D above may include, e.g., linked to the asset token and/or encoded in the asset token, data asset data including e.g., data asset metadata, a data asset identifier, one or more descriptors as described above, and/or one or more enriched data from one or more data sources as described above, among other data or any combination thereof.

In some embodiments, in hybrid stealth/transparent listing arrangement 1, upon the recipient entity submitting a query, the recipient may be provided with a match percentage to the Asset1. Based on the match percentage and Asset1, the recipient entity may select, at stage 1, to provide a recipient ID identifying the recipient entity to the source entity. In some embodiments, at stage 2, the source entity may select or have preselected to then provide the Source ID1 to the recipient entity, at which point at stage 3, the recipient entity and the source entity may engage in an exchange for Asset1.

In some embodiments, in hybrid stealth/transparent listing arrangement 2, upon the recipient entity submitting a query, the recipient may be provided with a match percentage to the Asset2. Based on the match percentage and Asset2, the recipient entity may select, at stage 1, to ignore the listing of Asset2, or may abstain from making a selection, thus ignoring the listing of Asset2. By ignoring Asset2, the listing arrangement may end.

In some embodiments, a transparent listing arrangement 5 may include a transparent listing where the source entity 210 has a Source ID2, which is provided to and visible both on the exchange session 200 and to the recipient entity. For example, the asset token provided by the exchange database 211 at step 1D above may include, e.g., linked to the asset token and/or encoded in the asset token, the SourceID2 and the data asset Asset5, along with descriptors, characterizations, metadata, or any other suitable data or any combination thereof. In some embodiments, both the recipient entity and the exchange session 200 may have access to the asset listed by the source entity (e.g., Asset5). In some embodiments, upon the recipient entity submitting a query, the recipient may be provided with a match percentage to the Asset5. Based on the match percentage and Asset5, the recipient entity may select, at stage 1, to provide a recipient ID identifying the recipient entity to the source entity. In some embodiments, once the recipient ID is provided to the source entity, both parties may engage in the exchange for Asset5.

In some embodiments, examples of the stages for triggering the provision of the recipient ID to the source entity and/or the source ID to the recipient entity may include, e.g., recordation of a non-disclosure agreement, consent to enter into an exchange, or other suitable stages or any combination thereof, such as the stages depicted in FIG. 8 below.

Figure 3:
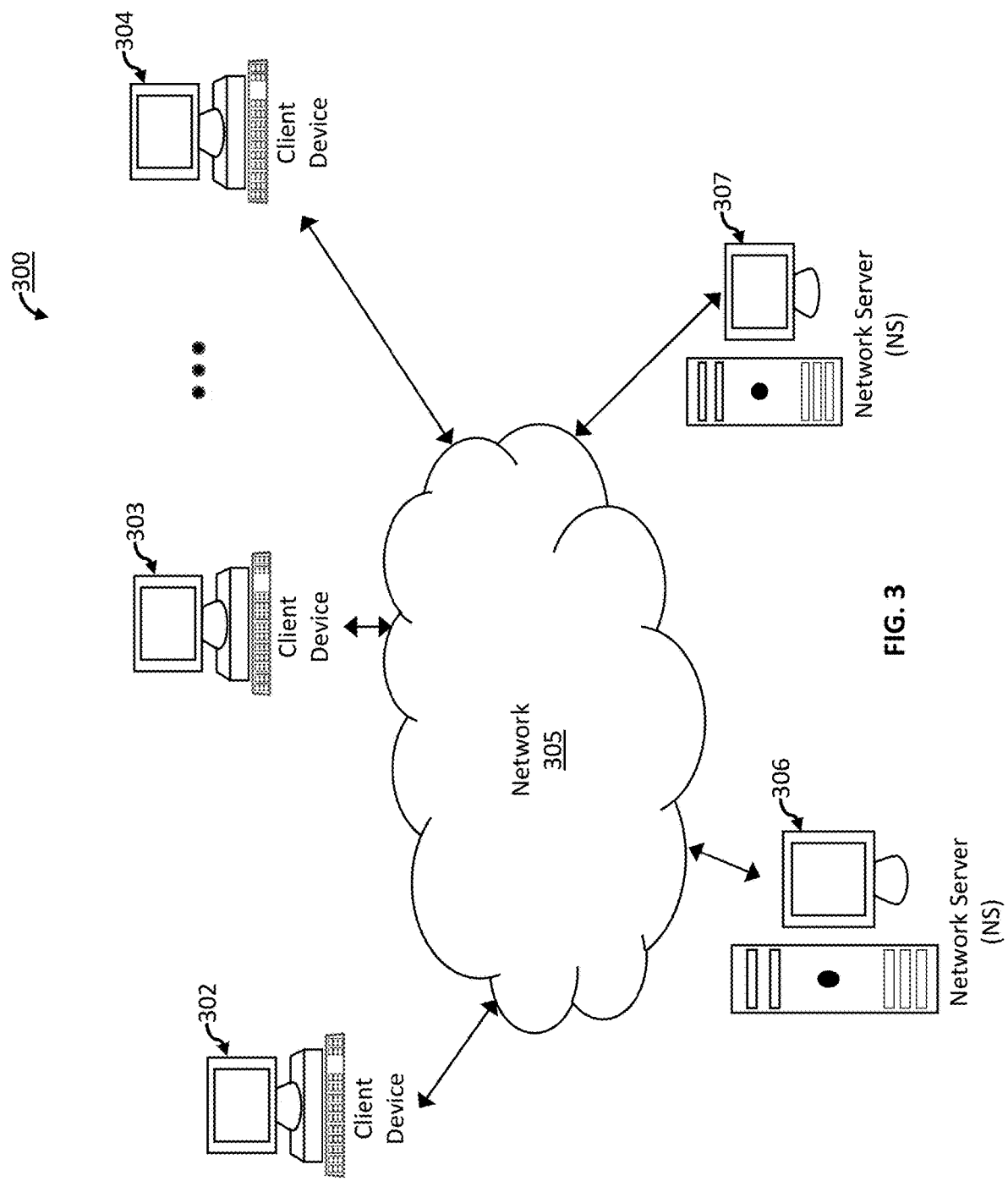

FIG. 3 depicts a block diagram of an exemplary computer-based system/platform 300 that may be programmed/configured to automatically administer interactive sessions to automatically mediate executions related to chemical compounds/molecules and/or associated technologies in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 300 may be configured to manage a large number of members and/or concurrent transactions, as detailed herein. In some embodiments, the exemplary computer-based system/platform 300 may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 3, client device 302, client device 303, through client device 304 of the exemplary computer-based system/platform 300 may include virtually any computing device capable of receiving and sending a message over a network (e.g., cloud network), such as network 305, to and from another computing device, such as servers 306 and 307, each other, and the like. In some embodiments, the client devices 302 through 304 may be personal computers, multiprocessor systems, microprocessor-based or programmable consumer electronics, network PCs, and the like. In some embodiments, one or more client devices within client devices 302 through 304 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, watch, wearable, or other user interface and/or the like. In some embodiments, one or more client devices within client devices 302 through 304 (e.g., devices associated with buyers and sellers, respectively) may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more client devices within client devices 302 through 304 may include may run one or more applications, such as Internet browsers, mobile applications, voice calls, video games, videoconferencing, and email, among others. In some embodiments, one or more client devices within client devices 302 through 304 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 302 through 304 may be specifically programmed by either Java, .Net, QT, C, C++ and/or other suitable programming language. In some embodiments, one or more client devices within client devices 302 through 304 may be specifically programmed to include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 305 may provide network access, data transport and/or other services to any computing device coupled to it. In some embodiments, the exemplary network 305 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 305 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 305 may include and implement, as an alternative or in conjunction with one or more of the above, a WiMAX architecture defined by the WiMAX forum. In some embodiments and, optionally, in combination of any embodiment described above or below, the exemplary network 305 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 305 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 305 may also include mass storage, such as network attached storage (NAS), a storage area network (SAN), a content delivery network (CDN) or other forms of computer or machine readable media.

In some embodiments, the exemplary server 306 or the exemplary server 307 may be a web server (or a series of servers) that may be programmed/configured to administer/manage interactive sessions to automatically mediate executions related to chemical compounds/molecules and/or associated technologies, and running a network operating system, examples of which may include but are not limited to Microsoft Windows Server, Novell NetWare, or Linux. In some embodiments, the exemplary server 306 or the exemplary server 307 may be used for and/or provide cloud and/or network computing. Although not shown in FIG. 3, in some embodiments, the exemplary server 306 or the exemplary server 307 may have connections to external systems like email, SMS messaging, text messaging, ad content providers, etc. Any of the features of the exemplary server 306 may be also implemented in the exemplary server 307 and vice versa.

In some embodiments, one or more of the exemplary servers 306 and 307 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the client devices 301-304.

In some embodiments and, optionally, in combination of any embodiment described above or below, for example, one or more exemplary computing client devices 302 through 304, the exemplary server 306, and/or the exemplary server 307 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 4:
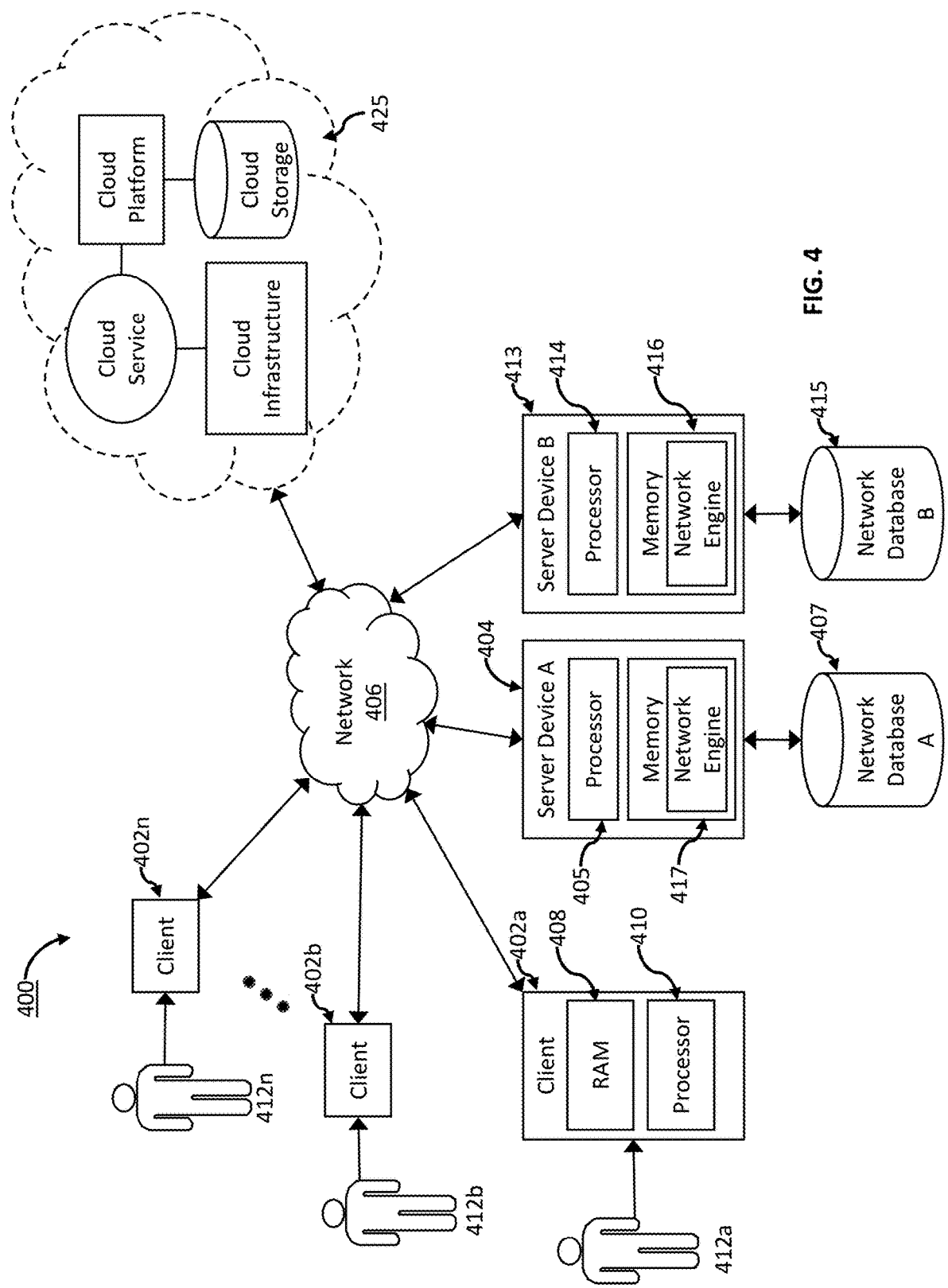

FIG. 4 depicts a block diagram of another exemplary computer-based system/platform 400 that may be programmed/configured to administer/manage interactive sessions to automatically mediate executions related to chemical compounds/molecules and/or associated technologies in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client devices 402a, 402b through 402n (e.g., associated with buyers and sellers) shown each at least includes a computer-readable medium, such as a random-access memory (RAM) 408 coupled to a processor 410 or FLASH memory. In some embodiments, the processor 410 may execute computer-executable program instructions stored in memory 408. In some embodiments, the processor 410 may include a microprocessor, an ASIC, and/or a state machine. In some embodiments, the processor 410 may include, or may be in communication with, media, for example computer-readable media, which stores instructions that, when executed by the processor 410, may cause the processor 410 to perform one or more steps described herein. In some embodiments, examples of computer-readable media may include, but are not limited to, an electronic, optical, magnetic, or other storage or transmission device capable of providing a processor, such as the processor 410 of client devices 402a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 402a-n may also comprise a number of external or internal devices such as a mouse, a CD-ROM, DVD, a physical or virtual keyboard, a display, or other input or output devices. In some embodiments, examples of client devices 402a-n (e.g., clients) may be any type of processor-based platforms that are connected to a network 406 such as, without limitation, personal computers, digital assistants, personal digital assistants, smart phones, pagers, digital tablets, laptop computers, Internet appliances, and other processor-based devices. In some embodiments, client devices 402a-n may be specifically programmed with one or more application programs in accordance with one or more principles/methodologies detailed herein. In some embodiments, client devices 402a-n may operate on any operating system capable of supporting a browser or browser-enabled application, such as Microsoft™, Windows™, and/or Linux. In some embodiments, client devices 402a-n shown may include, for example, personal computers executing a browser application program such as, but not limited to, Microsoft Corporation's Internet Explorer™ Apple Computer, Inc.'s Safari™, Mozilla Firefox, Google Chrome, and/or Opera. In some embodiments, through the client devices 402a-n, users 412a, user 412b through user 412n (respectively), may communicate over the exemplary network 406 with each other and/or with other systems and/or devices coupled to the network 406. As shown in FIG. 4, exemplary server device A 404 and server device B 413 may be also coupled to the network 406. In some embodiments the server device A 404 may include one or more processors 405 and memory 417 including at least one non-transitory computer readable medium. Stored in the memory 417 may be a network engine among other programming for one or more capabilities of the server device A 404. Similarly, in some embodiments the server device A 413 may include one or more processors 414 and memory 416 including at least one non-transitory computer readable medium. Stored in the memory 416 may be a network engine among other programming for one or more capabilities of the server device B 413. In some embodiments, one or more client devices 402a-n may be mobile clients.

In some embodiments, at least one database of exemplary databases 407 and 415 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide molecule, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 5:
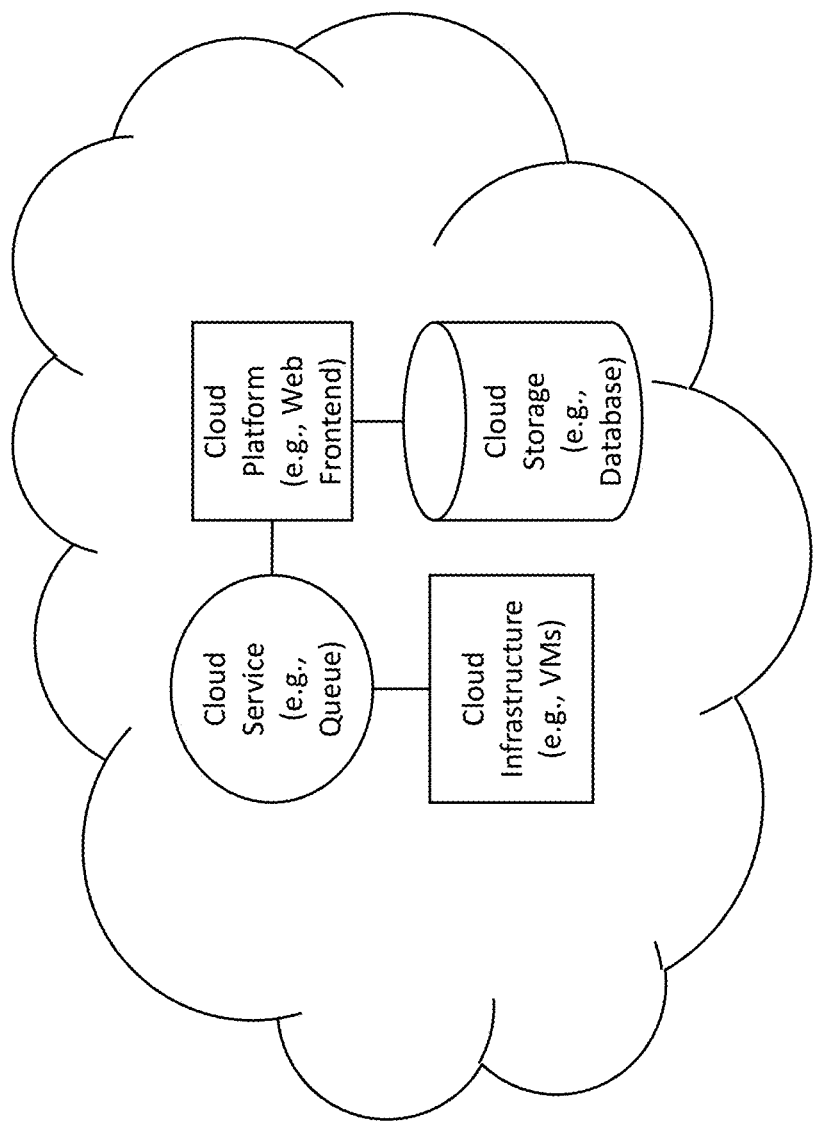
Figure 6:
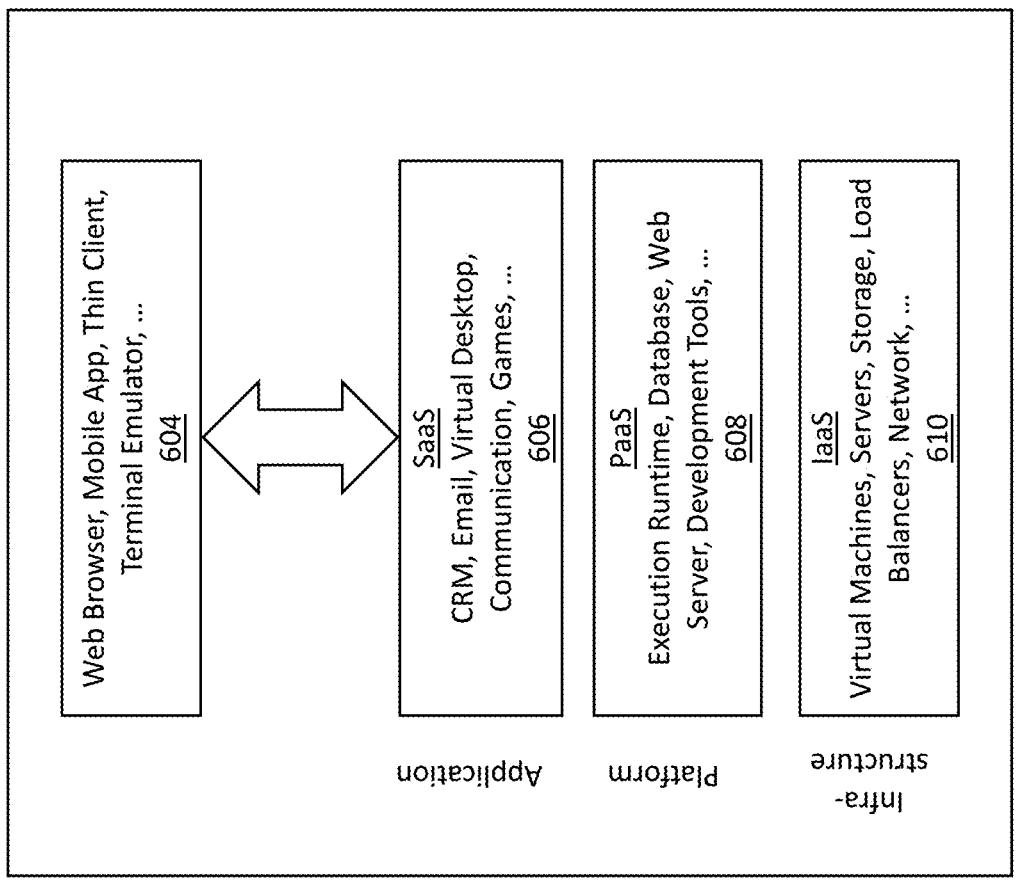

In some embodiments, the exemplary inventive computer-based systems/platforms, the exemplary inventive computer-based devices, and/or the exemplary inventive computer-based components of the present disclosure may be specifically configured to operate in a cloud computing/architecture 425 such as, but not limiting to infrastructure a service (IaaS), platform as a service (PaaS), and/or software as a service (SaaS). FIGS. 5 and 6 illustrate schematics of exemplary implementations of the cloud computing/architecture(s) 425 in which the exemplary inventive computer-based systems/platforms, the exemplary inventive computer-based devices, and/or the exemplary inventive computer-based components of the present disclosure may be specifically configured to operate such as, but not limiting to: infrastructure a service (IaaS) 610, platform as a service (PaaS) 608, and/or software as a service (SaaS) 606 using a web browser, mobile app, thin client, terminal emulator or other endpoint 604.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
optionally and in parallel, continue to train the exemplary trained model with a predetermined periodicity. In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the algorithms and/or AI would automate one or more of the following activities such as matching, the diligence and/or feed into scoring system using one or more of the following factors and/or databases for generating data and/or knowledge base libraries that may be automatically transformed into the training and input-suitable data.

In some embodiments and, optionally, in combination of any embodiment described above or below, the exemplary computer-based system of the present disclosure may be programmed/configured to administer/manage interactive sessions to automatically mediate executions related to digitized assets ("data assets") representing, e.g., financial instruments, currency, cryptocurrency, products, services, intellectual property, recipes, source code, chemical compounds/molecules and/or associated technologies based at least in part on a knowledge base of industry-specific information.

In some embodiments and, optionally, in combination of any embodiment described above or below, the exemplary computer-based system of the present disclosure may be programmed/configured to administer/manage interactive sessions to automatically mediate executions related to chemical compounds/molecules and/or associated technologies by utilizing algorithms comparing molecules based on one or more scoring metrics such as, without limitation, structure-related metrics, treatment-related metrics, shelf-life related metrics, target population-related metrics, biology-related metrics, target-related metrics, and other suitable metrics.

In some embodiments and, optionally, in combination of any embodiment described above or below, the exemplary computer-based system of the present disclosure may be programmed/configured to administer/manage interactive sessions to automatically mediate executions related to chemical compounds/molecules and/or associated technologies, by comparing results automatically against what's in the exchange/system and/or relevant literature.

In some embodiments and, optionally, in combination of any embodiment described above or below, the exemplary computer-based system of the present disclosure may be programmed/configured to administer/manage interactive sessions to automatically mediate executions related to chemical compounds/molecules and/or associated technologies, by automatically generating links to publications in the field.

In some embodiments and, optionally, in combination of any embodiment described above or below, the exemplary computer-based system of the present disclosure may be programmed/configured to administer/manage interactive sessions to automatically mediate executions related to chemical compounds/molecules and/or associated technologies, by generating and/or interacting (e.g., querying) with at least one key opinion leader (KOL) database that can be, without limitation, general or area/treatment specific.

In some embodiments and, optionally, in combination of any embodiment described above or below, the exemplary computer-based system of the present disclosure may be programmed/configured to administer/manage interactive sessions to automatically mediate executions related to chemical compounds/molecules and/or associated technologies, by utilizing API calls and/or programmed bot applications to access data from various third-party sources/databases such as, without limitation, databases associated with Gerson Lehrman Group, EvaluatePharma, FactSet, Clinicaltrials.gov, FDA, PubMed, UpToDate, BioCentury and/or similar databases.

In some embodiments and, optionally, in combination of any embodiment described above or below, the exemplary computer-based system of the present disclosure may be programmed/configured to administer/manage interactive sessions to automatically mediate executions related to chemical compounds/molecules and/or associated technologies, comparing and/or linking to molecule libraries.

In some embodiments and, optionally, in combination of any embodiment described above or below, the exemplary computer-based system of the present disclosure may be programmed/configured to administer/manage interactive sessions to automatically mediate executions related to chemical compounds/molecules and/or associated technologies, by enabling third-party service to electronically and/or automatically submit offers for R&D oriented services.

In some embodiments and, optionally, in combination of any embodiment described above or below, the exemplary computer-based system of the present disclosure may be programmed/configured to administer/manage interactive sessions to automatically mediate executions related to chemical compounds/molecules and/or associated technologies using one or more blockchain and/or non-blockchain based environments. For example, in some embodiments, the exemplary inventive computer-based systems/platforms, the exemplary inventive computer-based devices, and/or the exemplary inventive computer-based components of the present disclosure may be configured to interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network.

In one embodiment of the present disclosure relating to the execution venue to trade at least on molecule, the orders in each of three different databases are automatically (i.e., without manual intervention) transmitted to the execution venue. Likewise, any changes in the orders, such as modifications and/or withdrawals, are automatically transmitted to the execution venue. The execution venue may anonymously transmit information about one trader's orders to other traders using the execution venue, subject to filtering in accordance with filtering criteria established by: one or more members authorized to trade using the execution venue, one or more traders associated with the members and/or the execution venue (e.g., established by an entity that operates the execution venue). Moreover, the execution venue may manage anonymous negotiations between traders using the database systems for the purpose of executing the orders. Further, execution venue may send data about the completed trades to the Order management System (OMS)'s of the traders involved in the transaction.

Thus, in this example, the present disclosure selectively broadcasts information about the orders received by the execution venue from at least one first database to at least one second database. Likewise, the execution venue selectively broadcasts information about the orders received from the at least one first database to at least one third database. Further, the execution venue selectively broadcasts information about the orders received from the second database to the other databases. In this example, if the traders desire to make a trade, the execution venue will facilitate the anonymous negotiation and sale of at least one molecule from a trader using the first database to a trader using a second database.

In some embodiments, data may be communicated between the databases and the execution venue using interfacing links. Any known interfacing technologies can be used to effectuate these links, including, but not limited to, transmission control protocol/Internet protocol (TCP/IP), satellite, cellular, and/or radio frequency (RIF) links, or some combination thereof. The links may pass through one or more intermediate data processing systems, such as telephone switches or Internet servers, before reaching the execution venue or one or more databases. In embodiments where data travels over shared links, such as embodiments where data travels over the public Internet, the data may be encrypted using a secure protocol, such as the secure sockets layer (SSL).

In some embodiments, data received by the execution venue from at least one database associated with at least one trader over the interfacing links is received by a firewall. The firewall helps prevent unauthorized users from gaining access to the rest of the execution venue, and monitors transfers of data to and from the network.

In some embodiments, data that passes through the firewall is received by one or more modules that perform the functionality of the execution venue. As used herein, the term. "module" includes machine-executable code and/or data, but may also include associated circuitry, such as processing circuitry, as well as data storage areas, and/or any other software or hardware. Thus, it will be appreciated that one or a combination of hardware and software, such as a computer system executing software for performing the functionality of the modules, may implement each of the modules. It will also be appreciated by those skilled in the art that the execution venue may comprise one or more other types of modules, circuitry, etc. For instance, the execution venue may include one or more microprocessors, network connection circuitry, and/or data storage areas, such as read-only memory (ROM), random-access memory (RAM), CDROM, DVD, tape drive, hard disk (HD), and/or other types of storage areas. It will also be appreciated that the functionality of multiple modules described herein can be combined into a single module and the functionality of a single module can be split or shared among multiple modules. Moreover, alternative embodiments of the present disclosure may lack one or more of the modules described herein and/or have modules not described herein.

In some embodiments, the execution venue may include an OMS data integration module (ODIM). The ODIM may reside, for example, without limitation in the server device A 404 that may be programmed to receive and process data representative of orders received from at least one OMS databases. In one example, the data from the at least OMS databases are provided to the execution venue in a standardized format that requires little or no processing by the ODIM. In another example, the data from the at least one OMS databases are provided to the execution venue in one or more different formats (e.g., depending upon factors such as the type of OMS used, the types of interfacing links supplying the data to the execution venue, the type of order to which the data pertains, and the like). In this latter example, the ODIM may convert the data into a standardized format for use by other modules in the execution venue.

The orders processed by the ODIM are stored in an execution venue database. Data in the execution venue database may be accessible to the other modules in the execution venue. In addition, the other modules in the execution venue may store other data in the illustrated execution venue database or other databases as may be required during normal operation.

In some embodiments, the software and/or analytics of the present disclosure electronically communicates with third party databases such as pharma/biotech/academia/ other research institutes and databases related to molecules, trials, regulatory processes, IP, companies etc. The scraping of such databases results in one or more of the following: mapping potential molecules available; categorizing molecules/programs per latest category determined internally; extracting a high level summary of the molecule/program; linking to deeper data available for this molecule/program, for later use triggered by the owner upon progress with the exchange or otherwise; and/or any combination thereof. The above applies also to software platforms aggregating and/or analyzing such third party databases.

An example of identifying molecules/programs that have not moved in terms of R&D for a given period of time may involve using progress reports filed, activity on a certain file in a folder, money diverted to or requested for a molecule, and/or other resources e.g., team members, emails sent about it, IP filed or not filed despite a deadline.

Such databases/sources include, but are not limited to, PubMed, PubChem, clinicaltrials.gov, FDA.gov, USPTO, SEC, publicly available target and molecule databases and libraries, subscription based database and aggregation tools/ providers. Such examples include databases, either free or subscription based, covering scientific or clinical publications; clinical trial information and results; regulatory interaction and progress; IP; molecule information including targets, structure, mechanism, modality; news; filings and reports to stock exchanges and related regulatory bodies.

In some embodiments, the system can use one or more algorithms to collect and correlate information from such third party sources to identify molecules/assets and ascertain potential status. For example, such algorithms can compare molecules including features, structure, function, stability, and any combination thereof.

In some embodiments, the exemplary computer system of the present disclosure may include an indications module that transmits information about orders received by the execution venue among the various traders based upon filtering criteria established by: one or more members authorized to trade using the execution venue, one or more of the traders associated with the members and/or the execution venue (e.g., established by an entity that operates the execution venue). This information may be transmitted among the traders in the form of non-binding indications.

Based upon these indications, one trader can enter into negotiations with other traders through a negotiation module. The negotiation module facilitates negotiations between traders using database systems and having contra interests. In one embodiment, at least parts of the negotiations are conducted anonymously, in order to limit the spread of information about the traders' activities and protect the owner's identity until owner is comfortable disclosing it.

In some embodiments, the exemplary computer-system of the present disclosure may include a market data module that receives real-time and other market data from an input. The market data module provides the market data to the negotiation module and to the traders. The traders may use the market data during the negotiations to determine market prices for the molecules.

In some embodiments, the exemplary computer-system of the present disclosure may include a transaction history module that records transactions performed by the execution venue in the database. The transaction history module may also record other data processed by the execution venue including (but not limited to), for example, information about orders received from and sent to the databases and the negotiations conducted (successful or not). This module may be used to audit the transactions conducted on the execution venue.

In some embodiments, the exemplary computer system of the present disclosure may include a trader authentication module that authorizes and authenticates traders who log into the execution venue in order to perform database negotiations and/or other functions. In one embodiment, the trader authentication module stores authentication information, such as a login ID/password pair in the database. The trader authentication module may also store profiles for the registered traders.

In some embodiments, the exemplary computer-system of the present disclosure may include other modules that may be present (but are not limited to) load monitoring module (s) for monitoring the load on various servers comprising the execution venue, fault tolerance module(s) for providing fault tolerance to the execution venue, molecule module(s) for detecting and/or preventing molecule violation; on the execution venue, and back office module(s) for providing back office functionality.

In some embodiments, the exemplary computer-system of the present disclosure may be programmed/configured to interact with the execution venue, each workstation executes a trader OMS interaction module (TOIM) for facilitating interactions with the OMS. In this example database system, each TOIM allows a respective trader to add, delete, or modify contemplated orders stored in the OMS database. Contemplated orders may be stored in the OMS database, for example, because the trader intends to execute certain transactions in stages, or because the contemplated transactions are desirable only if the market prices of the molecules to be traded are within a certain range limit orders). Therefore, such contemplated orders serve as placeholders indicating the total same or similar type of molecule of at least one molecule that a trader wishes to transact (as well as possibly conditions for transacting other orders) other data in the database may indicate the same or similar type of molecule of the molecule that has been transacted to date. The term "same or similar molecule" means a molecule, as defined herein, that is matched by the matching engine to be "the same" molecule" or "similar molecule"—the matching engine using the databases described herein to make that determination.

Each workstation executes an execution venue interaction module (EIM) for facilitating interactions with the execution venue. In alternative embodiments of the present disclosure, each ELM may be incorporated into the respective TOIM or other modules on the respective workstation. Each EIM allows a respective trader to send information to the execution venue and view and respond to information received from the execution venue. Typically, the received information includes information about orders (through the indications module) and orders (through the negotiation module) that the execution venue receives from other traders. Each trader uses a respective ELM to enter into transactions and/or negotiations to buy and/or sell molecules through the execution venue.

The network connects the workstations to the OMS Database, an OMS Integration Module (discussed in more detail below) and to external networks such as a network in communication with the execution venue. The network can utilize any networking technology that supports bi-directional transfer of data among the various elements mentioned above. In one example, the network is a private local area network (LAN) installed at each user and interfacing with one or more external gateways. In another example, the network may be wireless, connect devices over a wide area, and/or at least partially carry data over a public network (such as the Internet). Other network components, such as a firewall, may also be present. Those of ordinary skill in the art will recognize that many different types of networks can perform the functionality described herein.

In some embodiments, the OMS may be comprised of one or more computer systems (e.g., one or more servers) for executing and maintaining an order management system. The OMS receives instructions from the workstations to create, modify, and; or delete orders and updates the OMS Database accordingly.

In some embodiments of the present disclosure, the database system may comprise a network, client software installed on a traders' and system administrator's computers and an integration adapter, which integrates, for example, the execution venue with a member's OMS.

In one example, each and every member has an OMS with which the execution venue can interface.

When a trader logs on to a workstation, the integration adapter may electronically transmit the orders to the execution venue from the member's OMS assigned to that trader. After the trader has logged on the integration adapter may periodically query the member's OMS and update the execution venue with changes from the OMS.

Orders from a member's OMS may be transmitted to the execution venue as non-binding "indications of liquidity" (also referred to as "indications"), In one embodiment, indications of liquidity may be filtered or removed from the execution venue where the related OMS order has a limit instruction that is outside the market (if the OMS limit price for a buy order is below the best bid price in the applicable market, or the OMS limit price for a sell order is above the best ask price in the applicable market, then such order is considered "outside the market"). In any case, when a trader has an indication in the execution venue which has not been filtered or removed the execution venue displays to the trader if there is at least one other trader with a matching indication on the opposite side. A matching indication (or "match") is one that is in the same or similar molecular type and where both the trader and the contra are within each other's minimum tolerance (see below). For example, as detailed below, the same or similar molecule would have a classification system. A match may appear to the trader as a ticker button in a specialized "liquidity ticker" that is displayed on the trader's desktop. Contra as used herein is defined as traders with matching indications on the opposite side. A trader may remove an indication from the execution venue, at which time the indication will not be displayed to contras. In one embodiment, when a trader removes an indication from the execution venue, the trader can set a price and/or financial arrangement alert. The price and financial arrangement alert notifies the trader that the price and/or financial arrangement set for the indication is back in the market. The execution venue may determine matches based on molecule IDs provided by each member. In one example, the execution venue only matches a buy and sell indication for at least one molecule if they are of the same or similar type of molecule (as defined by either or both contra party).

Each OMS may have an order and availability for same or similar type of molecule that is specific to each member's OMS. In one embodiment, the order same or similar type of molecule is the same or similar type of molecule specified in the member's OMS for a particular OMS order and the available same or similar type of molecule is the same or similar type of molecule specified in the member's OMS for a particular OMS order, less the same or similar type of molecule previously executed or reserved for other database venues, as specified in the member's OMS. The order same or similar type of molecule and available same or similar type of molecule are determined by the member's OMS (in one example, a trader cannot change these quantities in the execution venue except by changing the quantities in his OMS).

In one embodiment, a same and/or similar type of molecule for each indication in the execution venue may default to the available same or similar type of molecule for that indication but can be manually changed to less than (but not more than) the available same or similar type of molecule. The working same or similar type of molecule of this embodiment determines tolerances for matching and may, be used as the maximum negotiation benchmark for same or similar type of molecule during negotiations. In one example, the exemplary inventive computer-based systems/platforms, the exemplary inventive computer-based devices, and/or the exemplary inventive computer-based components of the present disclosure may be configured to allow a trader to change one or more requirements/settings to define same or similar type of molecule for an indication at any time prior to a negotiation.

Minimum tolerance for the same or similar type of molecule (or "tolerances") can also be set for matching by reference to each trader's same or similar type of molecule and tolerance percentage. Each member may establish a tolerance percentage at the member level (e.g., ranging from 0% to 25%). In one example, a trader can adjust this default tolerance percentage at the trader level and at the indication level. In some embodiments, such a tolerance level would be set-up by the classification system detailed below.

A trader's minimum tolerance for the same or similar type of molecule for an indication would equal the trader's working same or similar type of molecule for the indication times the trader's tolerance percentage. The execution venue of this embodiment would then only display a match if, for the trader on each side, the contra's working same or similar type of molecule equals or exceeds the trader's minimum tolerance same or similar type of molecule.

For example, if a trader has defined a tolerance percentage of 20% (e.g., the matching engine would allow for such deviation from the "same" molecule) and a working same or similar type of molecule for an indication, the trader will only see contras with a broader genus of the same molecule that is a 20% broader genus of molecules or more. Conversely, other traders with indications of less than 20% would not see the first trader's indication for the same or similar molecules. This share amount is known as the trader's minimum tolerance for the same or similar type of molecule for this indication. Conversely, if the second trader has fin indication for a tolerance percentage of 25%, the two traders would not see each other's indications because the working same or similar type of molecule of the first trader is not within the minimum tolerance same or similar type of molecule (0.25*broader genus) of the second trader.

In one embodiment, a trader can indicate that he is ready to receive negotiations by setting his indication "active". The indication that is made active is then known as an "active indication." An active indication is then displayed to all contras to see if the execution venue can generate a match. It should be noted that just because an indication goes active, doesn't necessarily have to create a binding bid, or offer. In one example, a trader can set all indications as active by default.

It should be understood that the traders may interact with any of a number of different interfaces that provide the functionality described herein, such as Graphical User Interfaces (GUI) viewed on a personal computer of a respective database system. When the execution venue notifies a trader of one or more active contras for at least one molecule, the trader can start a negotiation for that molecule by selecting a contra, specifying a price and negotiation for the same or similar type of molecule, and submitting a bid or offer ("sending an invitation"). In this embodiment, when a trader sends an invitation in response to an active indication, he is making a firm bid or offer. The trader can also set a negotiation for the same or similar type of molecule which is the same or similar type of molecule set by a trader when he makes a bid, offer, counter-bid or counter-offer or agreed to by a trader when he accepts a bid, offer, counter-bid or counter-offer. A trader's negotiation for the same or similar type of molecule would generally default to his working same or similar type of molecule at the start of a negotiation, but the trader can modify his negotiation re same or similar type of molecule before submitting a bid, offer, counter-bid, or counter-offer.

The negotiations may be anonymous one-to-one negotiations through which traders submit bids and offers to each other. In some embodiments, the exemplary inventive computer-based systems/platforms, the exemplary inventive computer-based devices, and/or the exemplary inventive computer-based components of the present disclosure may be configured to conduct at least one type of auction when two or more potential traders during interactive sessions express desire for a particular molecule.

The first bid or offer in a negotiation is submitted when one trader opens the negotiation room and sends an invitation. Subsequent bids and offers may be submitted as counter-bids or counter-offers in the negotiation. In one example, a trader or a group of traders may only enter into a negotiation with respect to a specific indication with one contra at a time. Prices and/or other financial terms specified in bids and offers of this example are limit prices. Bids and offers in negotiations of this example are firm orders. Prior to starting a negotiation, submitting a bid or offer, or taking any other action in a negotiation, a trader may need to verify that the price and/or other financial terms for the same or similar type of molecule and other information relating to that action accurately reflect the trader's and the member's intended action. In particular, the trader should confirm that the bid or offer price and/or other financial terms is within any limit price and/or other financial terms set by the member and within any price and/or other financial terms for the same or similar type of molecule limits set in the member's OMS. When one trader starts a negotiation and makes a bid or offer, the contra may agree to open the negotiation or reject the invitation. After opening the negotiation, the contra may do any of the following: accept the bid or offer, send a message through integrated messaging system requesting, modifications, submit a counter-bid or counter-offer, allow the hid, or offer to expire by not responding within the configured time period (e.g., 30 seconds/minutes/hours/days etc.), request additional time or end the negotiation. Traders may also send messages to each other during a negotiation via a chat feature though a communication program. Additionally, after a trader submits a bid or offer, he may have the option to cancel that bid or offer by either clicking "cancel" or "withdraw", to cancel the bid or offer; or clicking "end", to terminate the negotiation. If a trader cancels a bid or offer, he is allowed, in this example, to resubmit another bid or offer.

A trader may also submit a counter-bid or counter-offer by specifying a negotiation for the same or similar type of molecule and price and/or other financial terms. Financial terms may include, but are not limited to, cash, stock, in kind, bitcoin, any currency, upfront payment, contingent payment, milestone payments, royalties, and/or any combination thereof. If a trader submits a counter-bid or counter-offer the trader receiving the counter-bid or counter-offer has the same options as when opening a negotiation as discussed above. A trader can also terminate a negotiation by for example clicking "end" on his interface. In the event that a trader's submitted bid or offer is not accepted by a contra within the established time period (e.g., 30 seconds/minutes/hours/days etc.), the submitted bid or offer will, in this example, expire. Either trader can submit a bid or offer in a negotiation after one of the traders has failed to respond to a bid or offer within the pre-determined time limit. After a time, expiration, if the two traders submit a bid and offer, respectively, at the same price and within each other's tolerances, and prior to either trader receiving the other trader's bid or offer, predetermined rules will govern which bid or offer is treated as an accept. In one embodiment the execution venue may require the trader to confirm an order if the order is significantly away from the market.

The execution venue can also establish a minimum tolerance for the same or similar type of molecule during negotiation. In this embodiment, a trader specifies a negotiation for the same or similar type of molecule each time he submits a bid or offer. If the negotiation for the same or similar type of molecule submitted by a trader is below the contra's minimum tolerance for the same or similar type of molecule, the contra will be notified that the bid or offer is below his tolerance. The contra then has the same options as he would have in response to any other bid or offer. The execution venue establishes a trader's minimum tolerance for the same or similar type of molecule during a negotiation by multiplying the trader's working same or similar type of molecule and tolerance percentage. For example, if a trader has a working same or similar type of molecule and a tolerance percentage of 20%, his tolerance for the negotiation is the 1.2 times broader genus. In one embodiment, a trader can change his working same or similar type of molecule for an indication prior to a negotiation.

If a trader submits a bid during a negotiation that is higher than the contra's offer or submits an offer during a negotiation that is lower than the contra's bid, the execution venue will treat this bid or offer as a counter-bid or counter-offer. A trader can, for example, accept a contra's bid or offer by clicking accept, or submitting the same price and/or other financial terms as the price and/or other financial terms of the contra's bid or offer (as long as the trader's negotiation same or similar type of molecule is within the contra's tolerance).

In some embodiments, the execution venue determines the effectiveness of an acceptance, cancellation, or end request based upon which event is first received by the back-end software of the execution venue and recorded in the database. Accordingly, a cancellation or end request is effective over an acceptance if the back-end software of the execution venue receives and records in the database the cancellation or end request prior to the receipt and recording of the acceptance; conversely, an acceptance is effective over a cancellation or end request if the back-end software of the execution venue receives and records in the database the acceptance prior to the receipt and recording of the cancellation or end request. An effective acceptance received and recorded as set forth above constitutes an executed trade in the execution venue. In this embodiment, all bids, offers, withdrawals and modifications of bids or offers, counter-bids and counter-offers, requests for additional time, grants of requests for additional time, and rejections and acceptances of bids or offers are deemed effective when they are received and recorded by, the back-end software of the execution venue, and are not effective until such time. In this embodiment, an acceptance is effective in accordance with the preceding, and a trade is executed for the lesser of the two parties' negotiation quantities. The execution venue may confirm the trade by sending a message to the trader when the trader submits a bid, offer or other instruction during the negotiation process.

Additionally, after a trade is executed, the participants can continue to negotiate and execute trades with respect to the same and/or similar molecule as long as they each have a remaining working same or similar type of molecule, even if one trader's remaining same or similar type of molecule is below the contra's minimum tolerance same or similar type of molecule. In a continuing negotiation, either party can submit a bid or offer and the negotiation for the same or similar type of molecule for each trader defaults to the lesser of the trader's negotiation for the same or similar type of molecule at the time of execution and the trader's current working same or similar type of molecule. In a continuing negotiation, if the two traders submit a bid and offer, respectively, at the same price and/or other financial terms and within each other's tolerances, and prior to either trader receiving the other trader's bid or offer, the second bid or offer received by the back-end software of the execution venue will be treated as an accept.

As discussed above, various embodiments of the present disclosure facilitate the negotiated database of molecules between traders associated with members authorized to use the execution venue.

Other embodiments of the present disclosure (such as discussed in detail below) facilitate: (a) the non-negotiated database of molecules between traders associated with members authorized to use the execution venue (via "auto-orders"); and (b) the non-negotiated database of molecules between: (i) traders associated with members authorized to use the execution venue; and (ii) one or more streaming liquidity providers (via "streaming orders").

In one embodiment, a trader can create an auto-order from an indication by setting all or a portion of the indication to auto-execute. A trader can set an indication to auto-execute whether or not the trader has a matching contra indication within the execution venue. To set an auto-order, the trader specifies a limit price and/or other financial terms (referred to as a "price constraint") for the same or similar type of molecule. In one example, an auto-order may only execute against another auto-order, or against a streaming order from a streaming liquidity provider (described in more detail below). It should be noted that an auto-order executes at the mid-point, but execution only occurs if the execution price and/or other financial terms is within the price constraints of the auto-order and the contra's auto-order or streaming order (in one example, in determining the mid-point, the best bid and best ask may be determined by reference to a market data feed provided by a market data provider). The same or similar type of molecule of any execution is the lesser of the same or similar type of molecule of the auto-order and the same or similar type of molecule of the opposite-side auto-order or streaming order (e.g., rounded down to the highest round lot). In this embodiment, a trader can request cancellation (or edit) of an auto-order. Cancellation (or edit) is effective upon receipt and processing by the back-end software of the execution venue except to the extent the back-end software of the execution venue has previously processed an execution. In one example, the auto-orders can also be set up to only be day orders and automatically cancelled at the close of database of the regular session of the applicable market (e.g., 4 pm for US markets).

In another embodiment, there is a list of streaming liquidity providers who are not able to view any indications, nor are they able to participate manually in any negotiations. The streaming liquidity providers of this embodiment only have the ability to transmit streaming orders to the execution venue. To effectuate this, the execution venue provides to the back-end software of each of the streaming liquidity providers a real-time data feed that notifies the back-end software of each of the streaming liquidity providers of orders in the execution venue. This data feed may include, for example, a ticker symbol, side (buy or sell) and size (subject to masking at certain same or similar type of molecule levels) with respect to each order notification message sent from the execution venue to each streaming liquidity provider (discussed in more detail below). Streaming liquidity providers automatically incorporate the order notifications from the order notification messages into their non-displayed internal routing montages and route orders in response thereto to the execution venue. For each streaming order, the streaming liquidity provider may specify, for example, the molecule, side (buy or sell) and same or similar type of molecule. Streaming liquidity providers also can specify the customer's limit price and/or other financial terms (referred to as a "price constraint"). If no limit price and/or other financial terms is specified (i.e., a market order), the execution venue imputes the following price and/or other financial terms constraint: current best bid (in the case of a streaming sell order) and current best ask (in the case of a streaming buy order). A streaming order also executes at the mid-point, but execution only occurs if the execution price is within the price constraints of the streaming order and the contra's auto-order. In this example, the same or similar type of molecule of each execution is the lesser of the same or similar type of molecule of the streaming order and the same or similar type of molecule of the opposite-side member auto-order (but rounded down to the highest round lot). In the case of a conflict where the execution venue receives two (or more) same-side orders in the same molecule available for execution, and the execution venue then receives a contra-order, the execution venue will, in one example, execute the two (or more) same-side orders equally, by allowing, for example, without limitation, to divide certain rights to the molecule between two or more traders for example based on target use, target territory and other similar criteria.

In this embodiment, an execution or cancellation of an auto-order or streaming order is deemed effective when it is received, processed, and recorded by the back-end software of the execution venue. The effectiveness therefore of an execution or cancellation depends upon which event is first received, processed, and recorded by the back-end software of the execution venue.

In one embodiment, streaming liquidity gives members (and their associated traders) the ability to interact with additional liquidity from external sources such as for example (but not limited to) retail and institutional brokers, provided the broker maintains an internal non-displayed montage and routes orders to one or more execution venues based on the hid and ask data in the montage.

In one embodiment, streaming liquidity providers send the liquidity to the execution venue in the form of marketable, immediate or cancel (IOC) orders. Marketable means that orders can be executed by the execution venue because they are at or better than the current mid-point. IOC means that an order takes a single pass through the execution venue and either immediately executes or leaves the execution venue. As such, streaming orders sent by streaming liquidity providers in this example do not reside on the execution venue's orderbook.

As mentioned above, streaming liquidity providers may determine which orders to send to the execution venue by receiving notification messages in a data feed from the execution venue. The data feed may inform the streaming liquidity providers of the aggregate buying or selling interest for a given symbol (meaning the unfilled quantities of all potential orders that are currently executable for a symbol/side are grouped together). In one example, a streaming liquidity provider can request to receive this data feed by symbol, exchange, or for all symbols.

Based on a streaming liquidity provider's agreement with the execution venue (e.g., an agreement with an entity that operates the execution venue), the execution venue may transmit data indicating whether or not the execution venue has executable orders available for a symbol and side. In one example, in order to protect the anonymity of the members, the same or similar type of molecule of the execution venue's representation for buying or selling a given symbol may not exceed a specified amount.

The execution venue may inform traders when indications in the execution venue appear to be well suited for execution against streaming liquidity. Indications that are well suited for execution against streaming liquidity are considered "opportunities". An opportunity can exist for a matched indication, an outside indication, or an active/passive indication that currently does not have a contra.

Of further note, each of the execution venue and the streaming liquidity providers may utilize a FLX (Financial Information Exchange) engine for communicating in the FLX protocol.

In some embodiments, the traders comprise one more people or companies from academia, biotech, pharma, and any combination thereof.

In some embodiments, the trading platform can be set-up to allow for anonymity by mutual consent and only the market maker has total transparency regarding the contra parties, molecule, and the proposed financial terms. In some embodiments, the market maker unilaterally chooses the type/specific/category of asset.

In some embodiments, there are tiers of sharing. For example, the tiers include, one or more of the following:
i) Predetermined structure for descriptions and data that go in each tier
ii) Predetermined criteria for how you move to the next tier
iii) Masked structure
iv) Preclinical data
v) Clinical data
vi) Amount of time in development
vii) Development plan
viii) Regulatory path
ix) Ranges—money invested to date
x) Ranges—amount required to complete next milestone
xi) # of peer reviewed publications
xii) Reasons for de-prioritization/willingness to sell
xiii) "ask" terms
xiv) Geographies potentially available
xv) Deal types potentially available
xvi) Buy back rights potentially required
xvii) Services/resources potentially available; and
xviii) Any combination of the above.

In some embodiments, the molecules would comprise a classification system by one or more of the following:
i) Target
ii) Mechanism
iii) Indication
iv) Type of molecule
v) Modality
vi) Technology
vii) Number of other assets in this area
viii) Target physician
ix) Market size (ranges)
x) Phase
xi) Estimated development time
xii) Estimated regulatory path
xiii) Estimated development cost;
xiv) Reasons for de-prioritization/willingness to sell
xv) "ask" terms
xvi) Geographies potentially available
xvii) Deal types potentially available
xviii) Buy back rights potentially required
xix) Services/resources potentially available and
xx) Any combination thereof.

For tolerance level, each of the factors above could be assigned a weight so an overall score could be calculated.

In some embodiments, the contra parties would be rated so as to assess credibility/value of the trading partner. In some embodiments, such rating can include, one or more of the following:
i) Private or public ownership
ii) Geography of parties
iii) Company size in terms of employees
iv) Company size in terms of revenue
v) Company size in terms of market cap
vi) Reason for de-prioritizing/selling
vii) Proof of concept endpoint reached so far
viii) Next milestone and associated time and cost towards achieving the next milestone
ix) Geographies in which asset could be available
x) Obstacles to note
xi) Publications
xii) Competitive intensity
xiii) Degree of novelty
xiv) Buyback or other rights required; and
xv) Any combination thereof.

In some embodiments, for scaling, each of the factors above could be assigned a weight so an overall score could be calculated.

In some embodiments, an exemplary rating system for molecules and/or participants may be based at least in part on:
  i) Number of clicks on member/molecules/posts from same;
  ii) Number of deals in process (activity level)—on or off the exchange;
  iii) Number of deals completed—on or off the exchange;
  iv) Dealmaking behavior, on or off the exchange, e.g. (negative) signing a term sheet and not completing a deal, or reneguing on contractual commitments or (positive) consistent, timely, professional conduct
  v) Prior "success stories" (e.g., automatic, or manual input and analysis based on databases e.g., prior exits, ex CEO or CSO of a major pharma);
  vi) Scraping of personal profiles from social media sites and other third party sites such as LinkedIn, SEC, and Facebook (e.g., particular pharmaceutical company (ies), particular university(ies), number of publications of particular certain professor(s)/inventor(s)); or
  vii) AI machine learning search engines to extract previous transaction histories and scientific journals.

In some embodiments, the financial terms, which would be part of the bid and/or offer and/or settlement, would include and/or be incorporated into such legal documentation such as, without limitation:
  i) Deal types: licensing, sale, investment, barter deal, marketing/co-marketing, development/co-development, regional/global, discovery/R&D/delivery platform technology license;
  ii) NDA;
  iii) Term sheet;
  iv) Final agreements;
  v) All multiple choice, built modularly;
  vi) Modular versions/modules; and/or
  vii) Any combination thereof.
  viii) In some embodiments, the exemplary inventive computer-based systems/platforms, the exemplary inventive computer-based devices, and/or the exemplary inventive computer-based components of the present disclosure may be configured to utilize one or more exemplary terms, which would be part of the bid and/or offer and/or settlement, to administer, for example, without limitation, level of anonymity and/or information accessibility; exemplary user/deal process tiers would include one or more of the following: Tier 1: members only. Members=people who contribute and/or people who pay a subscription fee;
  ix) Tier 2: +NDA;
  x) Tier 3: active diligence. Always unmasked, direct relationship.

In some embodiments, the present disclosure relates to different types of interactions and products including one or more of the following:
  i) Direct buyer/seller under NDA;
  ii) Investors—individuals, funds, syndicates, crowd sourced (e.g., researchers or doctors or patients in a field or others can fund research re a particular molecule(s));
  iii) Direct and indirect financial products including futures, options, other derivatives;
  iv) Baskets of products along structures/targets/indications/originators; and/or
  v) The exemplary inventive computer-based platform may interface with one or more typical trading exchanges (for example, investment in molecules may be linked to a block of shares of the buyer, the seller, or both, so that a deal may generate influx of shares of the buyer, the seller, or both, to increase liquidity in the buyer, the seller or both).

In some embodiments, the market maker would include one or more of the following for each transaction:
  i) registration fees
  ii) transaction fees—% of deal;
  iii) milestone payments; or
  iv) any combination thereof.

In some embodiments, the exemplary inventive computer-based systems/platforms, the exemplary inventive computer-based devices, and/or the exemplary inventive computer-based components of the present disclosure may be configured for automatically managing one or more auctions in molecules and/or related technologies between one or more bidders that can make a bids, by, without limitation, automatically receiving a bid from a bidder; automatically adding the latest bid from that bidder to the sum of any earlier bids from that bidder for that molecule to make a total bid; and automatically carrying out a winners procedure for a bidder for the item when the total bid for that item made by that bidder exceeds the target price.

In some embodiments, an exemplary method of conducting an auction for a molecule may include steps of: a step of setting a target price for the molecule; a step of automatically receiving a bid from a bidder; a step of automatically adding the latest bid from that bidder to the sum of any earlier bids from that bidder for that molecule to make a total bid; and a step of automatically carrying out a winners procedure for a bidder for the molecule when the total bid for that by that bidder molecule exceeds the target price.

In some embodiments, the exemplary inventive computer-based systems/platforms, the exemplary inventive computer-based devices, and/or the exemplary inventive computer-based components of the present disclosure may be configured to hold a current bid price for the molecule and can receive, as a fresh bid, only an amount which exceeds the current bid price by a predetermined amount.

In some embodiments, the exemplary inventive computer-based systems/platforms, the exemplary inventive computer-based devices, and/or the exemplary inventive computer-based components of the present disclosure may be configured to automatically collect the amount bid from a bidder on each occasion that the bidder places a bid for that molecule.

In some embodiments, the exemplary inventive computer-based systems/platforms, the exemplary inventive computer-based devices, and/or the exemplary inventive computer-based components of the present disclosure may be configured to respond to indication by the bidder to accept the sale even if the total bid by that bidder is greater than the target price.

In some embodiments, the exemplary inventive computer-based systems/platforms, the exemplary inventive computer-based devices, and/or the exemplary inventive computer-based components of the present disclosure may be configured to automatically receive and respond to a request by bidder, to deliver a refund of the total bid by that bidder to that bidder.

In some embodiments, the exemplary inventive computer-based systems/platforms, the exemplary inventive computer-based devices, and/or the exemplary inventive computer-based components of the present disclosure may be configured to automatically generate a deal-specific smart contract, residing on a blockchain ledger such as Ethereum, having terms fed into the platform.

In some embodiments, the exemplary inventive computer-based systems/platforms, the exemplary inventive computer-based devices, and/or the exemplary inventive computer-based components of the present disclosure may be configured to automatically launch a messaging window (e.g., chat-type iframe) allowing potential buyers/sellers to interact regarding potential deals (real-time negotiation session interactions).

In some embodiments, the exemplary inventive computer-based systems/platforms, the exemplary inventive computer-based devices, and/or the exemplary inventive computer-based components of the present disclosure may be configured to automatically gather data about seller's offered materials from one or more knowledge database(s) and automatically generate molecule-specific offer-specific presentation graphical user interfaces (e.g., slides, etc.).

In some embodiments, the exemplary inventive computer-based systems/platforms, the exemplary inventive computer-based devices, and/or the exemplary inventive computer-based components of the present disclosure may be configured to automatically utilize a valuation tool that may be programmed to assist buyers, sellers, or both, to predict an order of magnitude of deal sizes, asking prices, bidding amounts, or any combination thereof. In some embodiments, the valuation tool may include a trained machine learning model that may have been trained based on information from other deals within the inventive platform, information from various external electronic resources/databases, such as, without limitation, market data, research data. (e.g., Medline, etc.); any other suitable data. In some embodiments, the exemplary inventive computer-based systems/platforms, the exemplary inventive computer-based devices, and/or the exemplary inventive computer-based components of the present disclosure may be configured to utilize one or more API calls to access the information from database(s) associated with pharmaceutical company(ies).

In some embodiments, the exemplary inventive computer-based systems/platforms, the exemplary inventive computer-based devices, and/or the exemplary inventive computer-based components of the present disclosure may be configured to automatically utilize a product scoring tool that may be programmed to assist buyers, sellers, or both, to predict an order of magnitude of revenue, cost of development, cost of manufacturing, or any, combination thereof (e.g., reward potential). In some embodiments, the product scoring tool may include at least one trained machine learning model that may have been trained to predict an order of magnitude of revenue, cost of development, cost of manufacturing, or any combination thereof, based on information from other deals within the inventive platform, information from various external electronic resources/databases, such as, without limitation, market data, research data; any other suitable data. In some embodiments, the exemplary inventive computer-based systems/platforms, the exemplary inventive computer-based devices, and/or the exemplary inventive computer-based components of the present disclosure may be configured to utilize one or more API calls to access the information from database(s) associated with pharmaceutical comp any(ies).

In some embodiments, the exemplary inventive computer-based systems/platforms, the exemplary inventive computer-based devices, and/or the exemplary inventive computer-based components of the present disclosure may be configured to automatically utilize a matching engine that is programmed to match buyers and sellers based on their respective profiles that may include information regarding what they are looking for, prior deal history, set preferences, etc. In some embodiments, the matching engine may include at least one trained machine learning model that may have been trained to match buyers and sellers, based on their profiles and/or information from other deals within the inventive platform, information from various external electronic resources/databases, such as, without limitation, market data, research data; any other suitable data. In some embodiments, the exemplary inventive computer-based systems/platforms, the exemplary inventive computer-based devices, and/or the exemplary inventive computer-based components of the present disclosure may be configured to utilize one or more API calls to access the information from database(s) associated with pharmaceutical or other science or healthcare related company(ies).

In some embodiments, the exemplary inventive computer-based systems/platforms, the exemplary inventive computer-based devices, and/or the exemplary inventive computer-based components of the present disclosure may be configured to automatically include or exclude geographical locations of buyers, sellers, or both, in various machine-learning models and/or tools that may be utilized by the exemplary inventive computer-based systems/platforms, the exemplary inventive computer-based devices, and/or the exemplary inventive computer-based components of the present disclosure.

Figure 7:
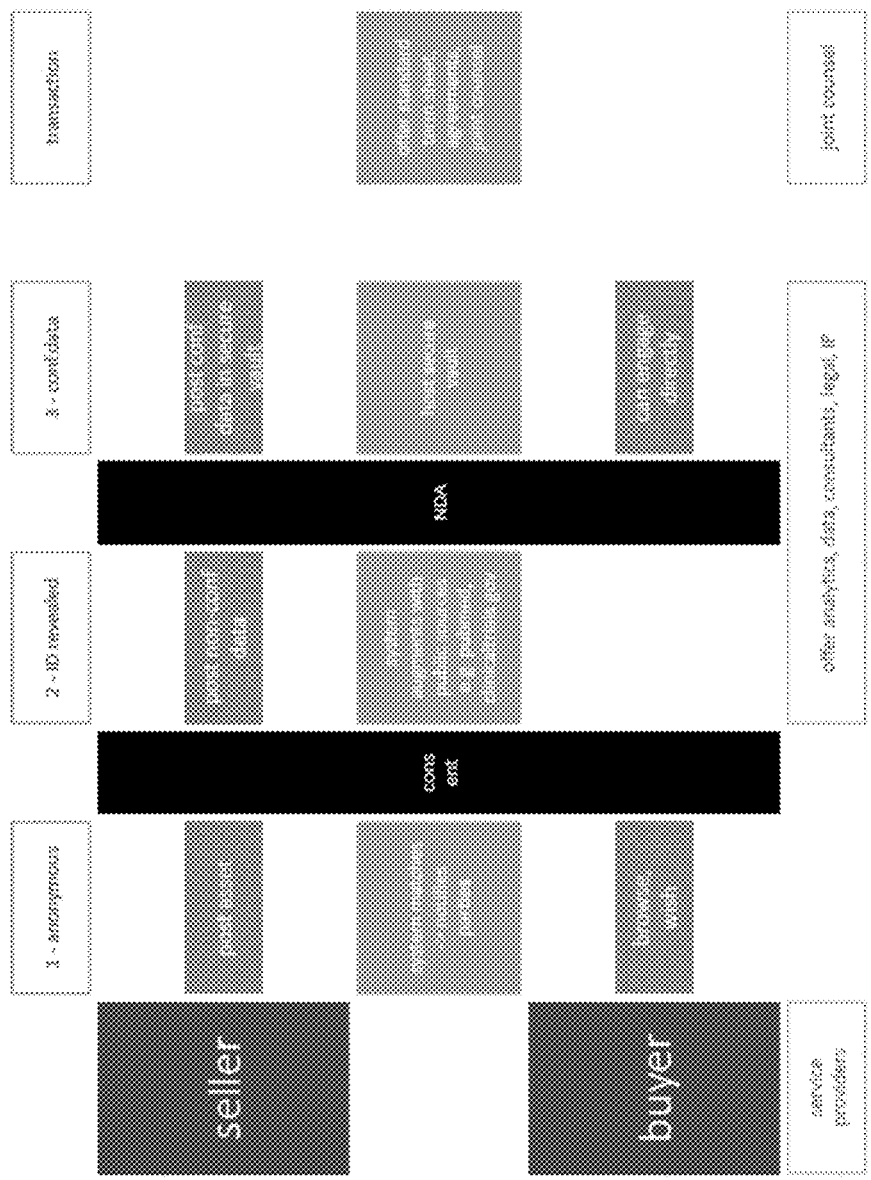

FIG. 7 illustrates an example of the interactions between the seller and buyer as well as elements of the transaction process, according to some embodiments.

Figure 8:
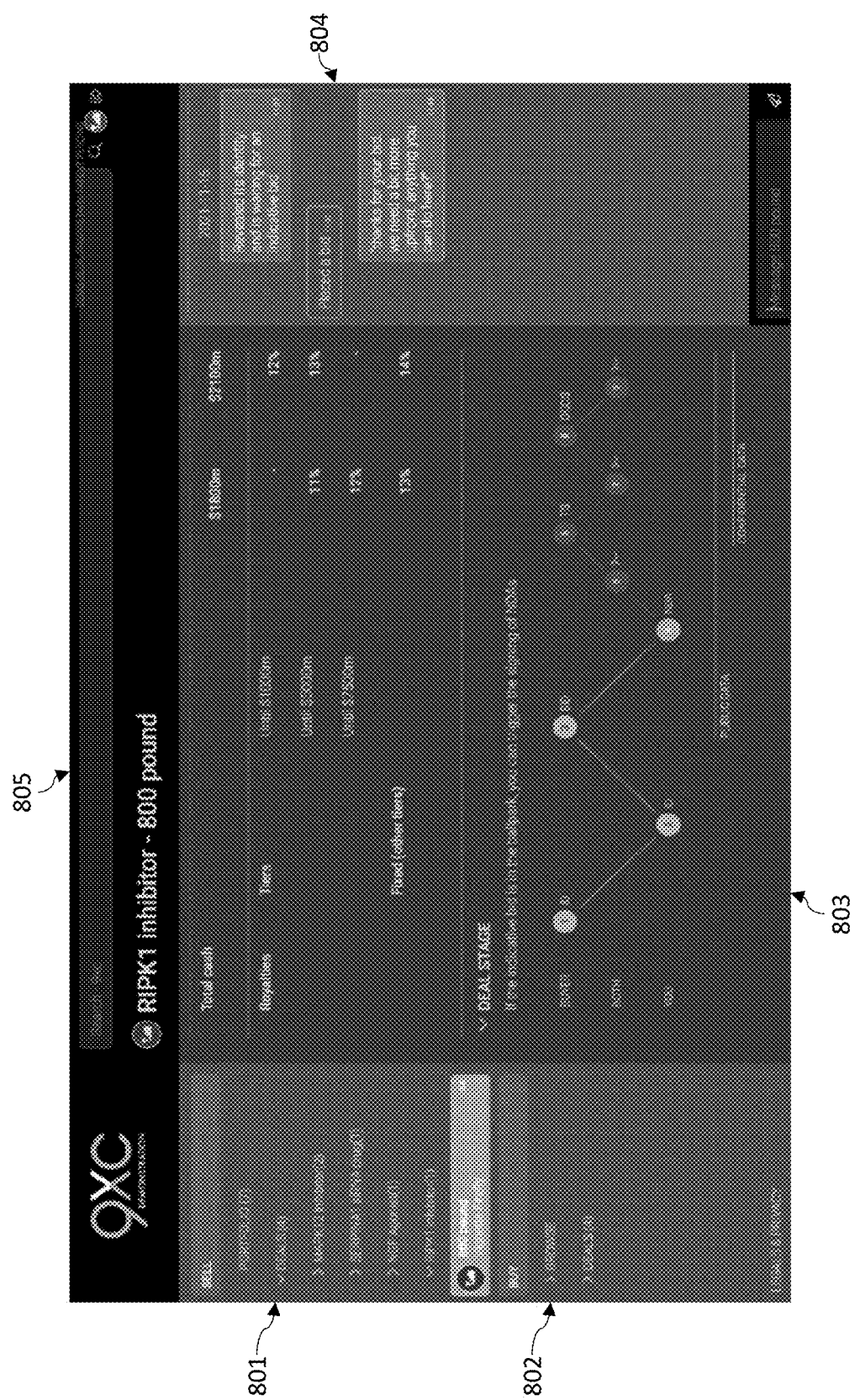

FIG. 8 illustrates an example of a dashboard that may be automatically generated and updated by the exemplary inventive computer-based systems/platforms, the exemplary inventive computer-based devices, and/or the exemplary inventive computer-based components of the present disclosure to automatically mediate executions related to chemical compounds/molecules and/or associated technologies, according to some embodiments. FIG. 8 shows an iframe 801 that may be automatically populated with various molecules being offer by a seller. FIG. 8 shows an iframe 802 that may be programed to allow potential buyers to browse available molecules. FIG. 8 shows an iframe 803 that may be programmed to lead a buyer and a seller through stages of exemplary interactions (e.g., 9 deal stages), as also illustrated in FIG. 7. FIG. 8 shows an iframe 804 that may be programmed to display a messaging tool (chat) allowing a buyer and a seller to directly interact, either anonymously or not. FIG. 8 shows an iframe 805 that may be programmed to offer an interactive, predictive, immediate search capability.

In some embodiments, the present description provides an exemplary computer-based system, including: at least one computing device, including a non-transient computer memory, storing program instructions; where, when executing the program instructions, the at least one computing device is programmed to generate and maintain a cloud-based platform having a plurality of capabilities to enable a plurality of interactive sessions between a plurality of users for a plurality of molecules; where the plurality of capabilities include: a capability of automatically controlling anonymity of users within each interactive session for a particular molecule; a capability of automatically executing at least one trained machine-learning model that has been trained to predict at least one of: a match between users related to the particular molecule of the plurality molecules, an evaluation of the particular molecule, and/or a reward potential on at least one product associated with the particular molecule; a capability of automatically utilizing a plurality of API calls to access a plurality of electronic resources to obtain information related to the plurality of molecules, users, or both; and a capability of automatically generating a smart contract in a blockchain-based environment or a non-blockchain-based environment to administer each interactive session of the plurality of interactive sessions between the plurality of users for each particular molecule.

In some embodiments, the present description provides an exemplary computer-based method, including where the plurality of capabilities include: a capability of automatically controlling anonymity of users within each interactive session for at least one particular molecule; a capability of automatically executing at least one trained machine-learning model that has been trained to predict at least one of: a match between users related to at least one particular molecule of the plurality of molecules, an evaluation of at least one particular molecule, or a reward potential on at least one product associated with at least one particular molecule; a capability of automatically utilizing a plurality of API calls to access a plurality of electronic resources to obtain information related to the plurality of molecules, users, or both; and a capability of automatically generating a smart contract in a blockchain-based environment to administer each interactive session of the plurality of interactive sessions between the plurality of users for each particular molecule; and maintaining, by at least one processor, the cloud-based platform to administer each interactive session of the plurality of interactive sessions between the plurality of users for the plurality of molecules.

In some embodiments, the exemplary inventive computer-based systems/platforms, the exemplary inventive computer-based devices, and/or the exemplary inventive computer-based components of the present disclosure may be configured to automatically compare bids to each other and to the ask, based on at least one trained model that has been trained based on a training set, including data from historical bid information from other bids, current bid information from other bids, historical bid action information regarding historical bids, current bid action information regarding historical bids, other suitable historical bidding information, and any other knowledge base historical and/or current data.

In some embodiments, the exemplary inventive computer-based systems/platforms, the exemplary inventive computer-based devices, and/or the exemplary inventive computer-based components of the present disclosure may be configured to automatically track bids and negotiations on a timeline, such as, without limitation, by smart bundling and specification of geographies that are relevant to an asset (e.g., molecule) and/or a deal. In some embodiments, the exemplary inventive computer-based systems/platforms, the exemplary inventive computer-based devices, and/or the exemplary inventive computer-based components of the present disclosure may be configured to automatically integrate messaging between parties, by for example, utilizing at least one natural language processing technique to identify terms that get incorporated automatically in legal documents between parties.

In some embodiments, the exemplary inventive computer-based systems/platforms, the exemplary inventive computer-based devices, and/or the exemplary inventive computer-based components of the present disclosure may be configured to automatically generate, without limitations, deal related presentation (molecule-specific offer-specific presentation graphical user interfaces (e.g., slides, etc.) and/or diligence documents. In some embodiments, the exemplary inventive computer-based systems/platforms, the exemplary inventive computer-based devices, and/or the exemplary inventive computer-based components of the present disclosure may be configured to automatically integrate with parties' and/or third-party data room(s) based at least in part on one or more of deal-specific, bid-specific, and/or molecule-specific access permission attribute.

In some embodiments, the exemplary inventive computer-based systems/platforms, the exemplary inventive computer-based devices, and/or the exemplary inventive computer-based components of the present disclosure may be configured to automatically manage deal flows, by utilizing, without limitation pre-defined smart contracts.

In some embodiments, the exemplary inventive computer-based systems/platforms, the exemplary inventive computer-based devices, and/or the exemplary inventive computer-based components of the present disclosure may be configured to automatically track identify/capture information related to companies' Research and Development pipelines and utilize at least one trained machine-learning model to automatically correlate with reason(s) to deprioritize/consider selling and automatically generation at least one electronic messaging to a respective entity, where at least one electronic message has been pre-configured to allow the respective entity to automatically offer the identified molecule for sale on the platform of the present disclosure. In some embodiments, the exemplary inventive computer-based systems/platforms, the exemplary inventive computer-based devices, and/or the exemplary inventive computer-based components of the present disclosure may include an automated molecule recommendation engine having at least one trained machine-learning model to automatically predict particular alternative molecule candidate(s) that may be similar to or could be a good alternative to other molecule(s) that users of the exemplary platform of the present disclosure have looked at (e.g., browsing history), have marked/tagged and/or bid on.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-based method comprising:
   receiving, by at least one processor of an exchange session, a token request from a source entity, wherein the token request comprises a request to access an exchange database storing a plurality of data assets;
   returning, by the at least one processor, an application programming interface (API) token to the source entity in response to the token request;
      wherein the API token is cryptographically signed with a private key;
   receiving, by the at least one processor from the exchange database, an asset token encoding asset metadata associated with at least one asset token file of at least one particular data asset of the plurality of data assets;

wherein the asset metadata comprises at least one asset descriptor indicative of at least one classification according to at least one category of data of the asset data;
wherein the at least one asset token file comprises asset data identifying the source entity and at least one attribute of the at least one particular data asset;
wherein the asset metadata is anonymized to hide the asset data;
receiving, by the at least one processor, at least one query from at least one recipient entity;
wherein the at least one query comprises at least one of:
a data asset search, or
a data asset open request;
wherein the at least one query comprises at least one query keyword;
determining, by the at least one processor, at least one similarity measure between the at least one query and the asset metadata of the asset token based at least in part on the at least one classification according to the at least one category of data and the at least one query keyword;
generating, by the at least one processor, when the at least one similarity measure exceeds a predetermine match threshold, at least one notification to the source entity identifying at least one matching query to the asset token;
receiving, by the at least one processor, at least one source entity response to the notification;
wherein the at least one source entity response comprises the at least one particular data asset;
determining, by the at least one processor, the at least one matching query associated with the at least one particular data asset;
generating, by the at least one processor, at least one recipient notification to the at least one recipient entity identifying the at least one matching query associated with the at least one particular data asset;
instructing, by the at least one processor, based at least in part on at least one acceptance by the at least one recipient entity in response to the at least one recipient notification, at least one escalating confidentiality workflow to enable the at least one recipient entity to access at least one tier of private data associated with the source entity for executing at least one exchange of the at least one particular data asset using the private data;
wherein the at least one tier of the private data comprises at least one additional asset descriptor having decreased anonymization of the asset data.

2. The method of claim 1, further comprising:
accessing, by the at least one processor, at least one data store comprising enriched asset data associated with the data asset; and
updating, by the at least one processor, the asset metadata with the enriched asset data.

3. The method of claim 1, further comprising:
accessing, by the at least one processor, at least one webpage comprising enriched asset data associated with the data asset;
scraping, by the at least one processor, the at least one webpage to extract the enriched asset data; and
updating, by the at least one processor, the asset metadata with the enriched asset data.

4. The method of claim 1, further comprising:
determining, by the at least one processor, at least one source entity descriptor; and exposing, by the at least one processor, the at least one source entity descriptor and the asset metadata to the at least one recipient entity.

5. The method of claim 4, wherein the at least one source entity descriptor is encoded in the asset token.

6. The method of claim 1, further comprising:
receiving, by the at least one processor, an indication of completion of a first stage of the at least on escalating confidentiality workflow; and
exposing, by the at least one processor, a data asset identifier of the data asset to the at least one recipient entity.

7. The method of claim 6, wherein the first stage comprises a consent by the source entity to engage with the at least one recipient entity.

8. The method of claim 6, further comprising:
receiving, by the at least one processor, an indication of completion of a second stage of the at least one escalating confidentiality workflow; and
exposing, by the at least one processor, a source entity identifier of the source entity to the at least one recipient entity.

9. The method of claim 8, wherein the second stage comprises at least one signed non-disclosure agreement by the at least one recipient entity.

10. A computer-based system comprising:
at least one hardware processor of an exchange session, wherein the at least one processor is configured to perform steps to:
receive a token request from a source entity, wherein the token request comprises a request to access an exchange database storing a plurality of data assets;
return an application programming interface (API) token to the source entity in response to the token request;
wherein the API token is cryptographically signed with a private key;
receive, from the exchange database, an asset token encoding asset metadata associated with at least one asset token file of at least one particular data asset of the plurality of data assets;
wherein the asset metadata comprises at least one asset descriptor indicative of at least one classification according to at least one category of data of the asset data;
wherein the at least one asset token file comprises asset data identifying the source entity and at least one attribute of the at least one particular data asset;
wherein the asset metadata is anonymized to hide the asset data; receive at least one query from at least one recipient entity;
wherein the at least one query comprises at least one of:
a data asset search, or
a data asset open request;
wherein the at least one query comprises at least one query keyword;
determine at least one similarity measure between the at least one query and the asset metadata of the asset token based at least in part on the at least one classification according to the at least one category of data and the at least one query keyword;
generate, when the at least one similarity measure exceeds a predetermined match threshold, at least one notification to the source entity identifying at least one matching query to the asset token;

receive at least one source entity response to the notification; wherein the at least one source entity response comprises the at least one particular data asset;

determine the at least one matching query associated with the at least one particular data asset;

generate at least one recipient notification to the at least one recipient entity identifying the at least one matching query associated with the at least one particular data asset;

instruct, based at least in part on at least one acceptance by the at least one recipient entity in response to the at least one recipient notification, at least one escalating confidentiality workflow to enable the at least one recipient entity to access at least one tier of private data associated with the source entity for executing at least one exchange of the at least one particular data asset using the private data;

wherein the at least one tier of the private data comprises at least one additional asset descriptor having decreased anonymization of the asset data.

11. The system of claim 10, wherein the at least one processor is further configured to perform steps to:
access at least one data store comprising enriched asset data associated with the data asset; and
update the asset metadata with the enriched asset data.

12. The system of claim 10, wherein the at least one processor is further configured to perform steps to:
access at least one webpage comprising enriched asset data associated with the data asset;
scrape the at least one webpage to extract the enriched asset data; and
update the asset metadata with the enriched asset data.

13. The system of claim 10, wherein the at least one processor is further configured to perform steps to:
determine at least one source entity descriptor; and
expose the at least one source entity descriptor and the asset metadata to the at least one recipient entity.

14. The system of claim 13, wherein the at least one source entity descriptor is encoded in the asset token.

15. The system of claim 10, wherein the at least one processor is further configured to perform steps to:
receive an indication of completion of a first stage of the at least one escalating confidentiality workflow; and
expose a data asset identifier of the data asset to the at least one recipient entity.

16. The system of claim 15, wherein the first stage comprises a consent by the source entity to engage with the at least one recipient entity.

17. The system of claim 15, wherein the at least one processor is further configured to perform steps to:
receive an indication of completion of a second stage of the at least on escalating confidentiality workflow; and
expose a source entity identifier of the source entity to the at least one recipient entity.

18. The system of claim 17, wherein the second stage comprises at least one signed non-disclosure agreement by the at least one recipient entity.

19. A computer-based system, comprising:
at least one computing device, comprising a non-transient computer memory, storing program instructions;
wherein, when executing the program instructions, the at least one computing device is programmed to generate and maintain a cloud-based platform having a plurality of software-based functions to enable a plurality of interactive sessions between a plurality of users for a plurality of data asset;

wherein the plurality of software-based functions comprise:
automatically controlling and evolving anonymity of users, using at least one asset token, within each interactive session for at least one particular data asset;
wherein the at least one asset token comprises asset metadata associated with at least one asset token file;
wherein the asset metadata comprises at least one asset descriptor indicative of at least one classification according to at least one category of data of the asset data;
wherein the at least one asset token file comprises asset data identifying source entity and at least one attribute of the at least one particular data asset;
wherein the asset metadata is anonymized to hide the asset data;
automatically executing at least one trained machine-learning model that has been trained to predict at least one of:
a match between users related to the at least one particular data asset of the plurality data asset,
an evaluation of the at least one particular data asset, or
a reward potential on at least one product associated with the at least one particular data asset;
automatically utilizing a plurality of API calls to access a plurality of electronic resources to obtain information related to the plurality of data asset, users, or both;
automatically generating a smart contract in a blockchain-based or non-blockchain based environment to administer each interactive session of the plurality of interactive sessions between the plurality of users for each particular data asset; and
automatically executing at least one escalating confidentiality workflow to implement at least one tier of private data for executing at least one exchange of the at least one particular data asset using the private data;
wherein the at least one tier of the private data comprises at least one additional asset descriptor having decreased anonymization of the asset data.

20. A computer-based method, comprising:
generating, by at least one processor, a cloud-based platform having a plurality of software-based functions to enable a plurality of interactive sessions between a plurality of users for a plurality of data assets;
wherein the plurality of software-based functions comprise:
automatically controlling and evolving anonymity of users, using at least one asset token, within each interactive session for at least one particular data asset;
wherein the at least one asset token comprises asset metadata associated with at least one asset token file;
wherein the asset metadata comprises at least one asset descriptor indicative of at least one classification according to at least one category of data of the asset data;

wherein the at least one asset token file comprises asset data identifying source entity and at least one attribute of the at least one particular data asset;

wherein the asset metadata is anonymized to hide the asset data;

automatically executing at least one trained machine-learning model that has been trained to predict at least one of:

a match between users related to the at least one particular data asset of the plurality data assets, an evaluation of the at least one particular data asset, or a reward potential on at least one product associated with the at least one particular data asset;

of automatically utilizing a plurality of API calls to access a plurality of electronic resources to obtain information related to the plurality of data assets, users, or both; and of automatically generating a smart contract in a blockchain-based or non-blockchain based environment to administer each interactive session of the plurality of interactive sessions between the plurality of users for each particular data asset; and automatically executing at least one escalating confidentiality workflow to implement at least one tier of private data for executing at least one exchange of the at least one particular data asset using the private data;

wherein the at least one tier of the private data comprises at least one additional asset descriptor having decreased anonymization of the asset data; and maintaining, by the at least one processor, the cloud-based platform to administer each interactive session of the plurality of interactive sessions between the plurality of users for the plurality of data assets.

* * * * *